United States Patent
Nishimura

(10) Patent No.: US 7,613,122 B2
(45) Date of Patent: Nov. 3, 2009

(54) RELAY DEVICE FOR SELECTING AN OPTIMAL PATH

(75) Inventor: Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 11/102,690

(22) Filed: Apr. 11, 2005

(65) Prior Publication Data
US 2006/0140167 A1 Jun. 29, 2006

(30) Foreign Application Priority Data
Dec. 24, 2004 (JP) .............................. 2004-373912

(51) Int. Cl.
*G01R 31/08* (2006.01)
*H04L 12/28* (2006.01)

(52) U.S. Cl. ..................... 370/238; 370/230.1; 370/232; 370/254; 370/255

(58) Field of Classification Search ......... 370/230–235, 370/254, 297, 299, 230.1, 255, 256
See application file for complete search history.

(56) References Cited

U.S. PATENT DOCUMENTS

| 6,069,894 | A * | 5/2000 | Holender et al. ............. 370/397 |
| 6,418,139 | B1 * | 7/2002 | Akhtar ........................ 370/356 |
| 6,778,496 | B1 * | 8/2004 | Meempat et al. ............. 370/230 |
| 6,993,593 | B2 * | 1/2006 | Iwata .......................... 709/238 |
| 2003/0053422 | A1 * | 3/2003 | Ambe ........................ 370/256 |
| 2004/0196790 | A1 * | 10/2004 | Balakrishnan et al. ...... 370/232 |
| 2004/0208123 | A1 * | 10/2004 | Sakata et al. ................ 370/232 |
| 2005/0141510 | A1 * | 6/2005 | Narsinh et al. ........... 370/395.2 |
| 2005/0152289 | A1 * | 7/2005 | Nagata et al. ................ 370/256 |

FOREIGN PATENT DOCUMENTS

| JP | 11-177596 | 7/1999 |
| JP | 2004-140777 | 5/2004 |

OTHER PUBLICATIONS

Cisco System, Inc, "Software Configuration Guide: Catalyst 4000, Catalyst 2948G, Catalyst 2980G" 2000, pp. 1-35_8.*
Lidinsky et al., "802.1Q: IEEE Standards for Local and metropolitan area networks: Virtual Bridged Local Area Networks" IEEE Std 802.1Q. May 2003, pp. 1-312.*
Jeffree et al., "IEEE std 802.1s IEEE Standards for Local and metropolitan area networks: Virtual Bridged Local Area Networks-Amendment 3: Multiple Spanning Trees" IEEE Std 802.1s, Dec. 2002, pp. 1-211.*

* cited by examiner

*Primary Examiner*—Daniel J Ryman
*Assistant Examiner*—Thinh D Tran
(74) *Attorney, Agent, or Firm*—Hanify & King, P.C.

(57) ABSTRACT

A relay device includes a plurality of physical ports physically connected to a plurality of other relay devices on a network to form physical links; a setting unit for setting one or more logical links for each of the physical links; an evaluation unit for automatically adding an evaluated value based on communication characteristics of the logical link when a control packet is received from a first relay device through the logical link or the control packet is transferred to a second relay device through the logical link; and a unit for selecting, when there are a plurality of routes that merge at the relay device, one of the routes based on evaluated values accumulated by the other relay devices.

8 Claims, 23 Drawing Sheets

FIG. 3

| PHYSICAL PORT | STI | VLAN | SHAPING RATE[b/s] |
|---|---|---|---|
| 1 | 1 | 1 | 200M |
| | 1 | 2 | 400M |
| | 2 | 3 | — |
| 2 | 1 | 1 | 50M |
| | 1 | 2 | 50M |
| | 2 | 3 | — |

FIG. 4

| PHYSICAL PORT | STI | VLAN | POLICING RATE[b/s] |
|---|---|---|---|
| 1 | 1 | 1 | — |
| | 1 | 2 | — |
| | 2 | 3 | — |
| 2 | 1 | 1 | 50M |
| | 1 | 2 | 50M |
| | 2 | 3 | — |

FIG. 9

| LINK | LOGICAL BAND | APPLIED PATH COST | PC ADDED VALUE OF BPDU |
|------|--------------|-------------------|------------------------|
| 1    | 600Mb/s      | 33333             | 13333                  |
| 2    | 100Mb/s      | 200000            | 180000                 |
| 3    | 100Mb/s      | 200000            | —(BECAUSE OF POLICER)  |

FIG. 10

| LINK | LOGICAL BAND | APPLIED PATH COST | PC ADDED VALUE OF BPDU |
|---|---|---|---|
| 1 | 400Mb/s | 50000 | 30000 |
| 2 | 900Mb/s | 22222 | 2222 |
| 3 | 1Gb/s | 20000 | — |

FIG. 13

| LOGICAL BAND [b/s] | PATH COST |
|---|---|
| LESS THAN 1 M | 20,000,000 |
| 1 M—10 M | 2,000,000 |
| 10 M—100 M | 200,000 |
| 100 M—1 G | 20,000 |
| 1 G—10 G | 2,000 |
| 10 G OR MORE | 200 |

FIG. 14

| BRIDGE | OPERATION |
|---|---|
| BRIDGE 1 | PORT1<br>・200 M SHAPER IS SET IN VLAN 1<br>・400 M SHAPER IS SET IN VLAN 2<br>PORT2<br>・50 M SHAPER IS SET IN VLAN 1<br>・50 M SHAPER IS SET IN VLAN 2 |
| BRIDGE 2 | ・NONE |
| BRIDGE 3 | PORT2<br>・50 M POLICER IS SET IN VLAN 1<br>・50 M POLICER IS SET IN VLAN 2 |

FIG. 15

| BRIDGE | OPERATION |
|---|---|
| BRIDGE 1 | PORT1<br><br>• 200 M SHAPER IS SET IN VLAN 1<br><br>• 400 M SHAPER IS SET IN VLAN 2<br><br>• CHECK SHAPING RATE IN OPPOSITE PORT (BRIDGE 3) OF VLANS 1 AND 2 BELONGING TO STI = 1<br><br>• CHECK SHAPING RATE IN OPPOSITE PORT (BRIDGE 3) OF VLAN 3 BELONGING TO STI = 2<br><br>PORT2<br><br>• 50 M SHAPER IS SET IN VLAN 1<br><br>• 50 M SHAPER IS SET IN VLAN 2<br><br>• CHECK SHAPING RATE IN OPPOSITE PORT (BRIDGE 2) OF VLANS 1 AND 2 BELONGING TO STI = 1<br><br>• CHECK SHAPING RATE IN OPPOSITE PORT (BRIDGE 2) OF VLAN 3 BELONGING TO STI = 2 |

FIG. 16

| BRIDGE | OPERATION |
|---|---|
| BRIDGE 2 | PORT1<br><br>· CHECK SHAPING RATE IN OPPOSITE PORT (BRIDGE 1) OF VLANS 1 AND 2 BELONGING TO STI = 1<br>→ CALCULATE TOTAL VALUE (100 M) OF SHAPING RATES<br>→ CALCULATE CORRESPONDING PATH COST (200 THOUSAND) FROM TOTAL VALUE<br>→ INPUT PATH COST OF 200 THOUSAND TO LOGICAL PORT OF STI = 1<br><br>· CHECK SHAPING RATE IN OPPOSITE PORT (BRIDGE 3) OF VLAN 3 BELONGING TO STI = 2<br>→ CHECK ALL RESERVED BANDS OTHER THAN VLAN 3, AND CALCULATE FREE BAND (900 M)<br>→ CALCULATE CORRESPONDING PATH COST (22 THOUSAND) FROM FREE BAND<br>→ INPUT PATH COST OF 22 THOUSAND TO LOGICAL PORT OF STI = 2<br><br>PORT2<br><br>· CHECK SHAPING RATE IN OPPOSITE PORT (BRIDGE 1) OF VLANS 1 AND 2 BELONGING TO STI = 1<br><br>· CHECK SHAPING RATE IN OPPOSITE PORT (BRIDGE 1) OF VLAN 3 BELONGING TO STI = 2 |

FIG. 17

| BRIDGE | OPERATION |
|---|---|
| BRIDGE 3 | PORT1<br><br>·CHECK SHAPING RATE IN OPPOSITE PORT (BRIDGE 1) OF VLANS 1 AND 2 BELONGING TO STI = 1<br>→CALCULATE TOTAL VALUE (600 M) OF SHAPING RATES<br>→CALCULATE CORRESPONDING PATH COST (33 THOUSAND) FROM TOTAL VALUE<br>→INPUT PATH COST OF 33 THOUSAND TO LOGICAL PORT OF STI = 1<br><br>·CHECK SHAPING RATE IN OPPOSITE PORT (BRIDGE 2) OF VLAN 3 BELONGING TO STI = 2<br>→CHECK ALL RESERVED BANDS OTHER THAN VLAN 3, AND CALCULATE FREE BAND (400 M)<br>→CALCULATE CORRESPONDING PATH COST (50 THOUSAND) FROM FREE BAND<br>→INPUT PATH COST OF 50 THOUSAND TO LOGICAL PORT OF STI = 2<br><br>PORT2<br><br>·50 M POLICER IS SET IN VLAN 1<br><br>·50 M POLICER IS SET IN VLAN 2<br><br>·CHECK SHAPING RATE IN OPPOSITE PORT (BRIDGE 1) OF VLANS 1 AND 2 BELONGING TO STI = 1<br><br>·CHECK SHAPING RATE IN OPPOSITE PORT (BRIDGE 1) OF VLAN 3 BELONGING TO STI = 2<br><br>·CALCULATE POLICING RATE TOTAL VALUE (100 M) OF VLANS 1 AND 2 BELONGING TO STI = 1<br>→CALCULATE CORRESPONDING PATH COST (200 THOUSAND) FROM TOTAL VALUE<br>→INPUT PATH COST OF 200 THOUSAND TO LOGICAL PORT OF STI = 1 |

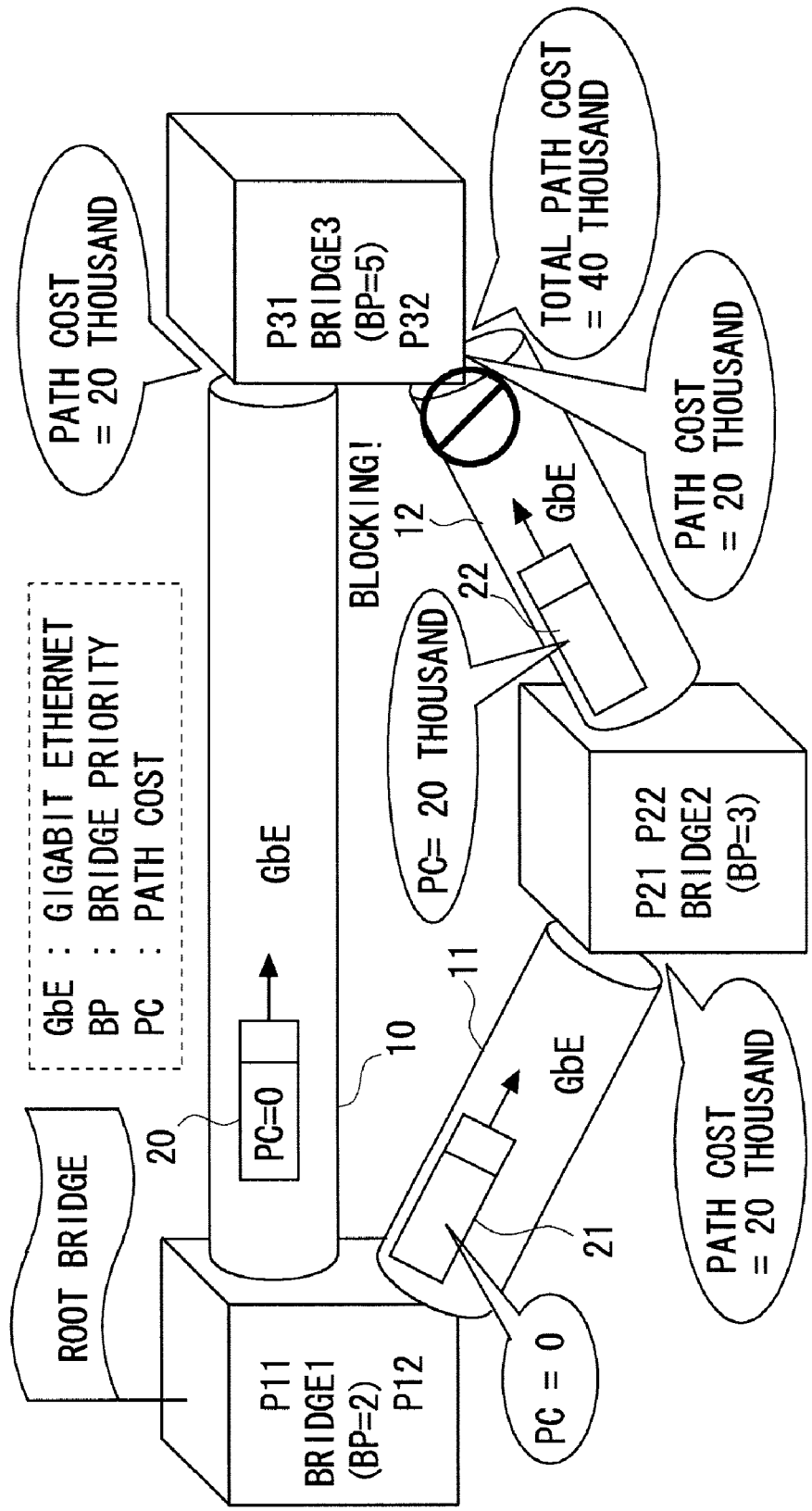

FIG. 19
Prior Art

| PARAMETER | LINK SPEED | RECOMMENDED VALUE | RECOMMENDED RANGE | RANGE |
|---|---|---|---|---|
| INTERNAL PORT PATH COST | <=100Kb/s | 200,000,000 | 20,000,000 – 200,000,000 | 1 – 200,000,000 |
| | 1Mb/s | 20,000,000 | 2,000,000 – 200,000,000 | 1 – 200,000,000 |
| | 10Mb/s | 2,000,000 | 200,000 – 20,000,000 | 1 – 200,000,000 |
| | 100Mb/s | 200,000 | 20,000 – 2,000,000 | 1 – 200,000,000 |
| | 1Gb/s | 20,000 | 2,000 – 200,000 | 1 – 200,000,000 |
| | 10Gb/s | 2,000 | 200 – 20,000 | 1 – 200,000,000 |
| | 100Gb/s | 200 | 20 – 2,000 | 1 – 200,000,000 |
| | 1Tb/s | 20 | 2 – 200 | 1 – 200,000,000 |
| | 10Tb/s | 2 | 1 – 20 | 1 – 200,000,000 |

RELAY DEVICE FOR SELECTING AN OPTIMAL PATH

BACKGROUND OF THE INVENTION

The present invention relates to a relay device for selecting a route.

In a network of Ethernet (registered trademark) that has a physical loop, a STP (Spanning Tree Protocol) has been used for preventing endless circulation of data. The STP is a protocol for providing a logical route tree by transferring a control packet called a BPDU (Bridge Protocol Data Unit) among bridges constituting the network based on given priority. To generate the tree, the STP logically blocks ports of bridges unselected on the route.

The STP builds a tree in which a bridge of the lowest bridge priority value is a root bridge and a total value of path costs therefrom is minimal. The BPDU is used for propagating the path costs from the root bridge. In other words, each port of the bridge that has received the BPDU adds its own path cost value to a path cost field of the BPDU, and sends the result to a bridge on a downstream side.

FIG. 18 shows a route selection operation of the STP. In a network model shown in FIG. 18, three bridges 1 to 3 (BRIDGES 1 to 3 shown in FIG. 18) are interconnected through Gigabit Ethernet (registered trademark) (GbES 10 to 12 shown in FIG. 18). The bridges 1 to 3 are connected to the GbES 10 to 12 through physical ports (P11, 12, 21, 22, 31, and 32 shown in FIG. 18, and referred to as ports hereinafter). Specifically, the port 11 of the bridge 1 and the port 31 of the bridge 3 are interconnected through the GbE 10, the port 12 of the bridge 1 and the port 21 of the bridge 2 are interconnected through the GbE 11, and the port 22 of the bridge 2 and the port 32 of the bridge 3 are interconnected through the GbE 12. The bridges 1 to 3 constituting such a network calculate a total path cost of the bridges by using a BPDU that is a control packet (BPDUS 20 to 22 shown in FIG. 18).

In the network model shown in FIG. 18, the bridge 1 of the smallest BP value (BP=2) becomes a root bridge. Here, there are two routes from the bridge 1 to the bridge 3: [1] a route through the GbE 10, and [2] a route through the bridge 2 (route through the GbES 11 and 12). A route selection operation of the STP in this case is as follows.

First, for the route of [1], the bridge 3 is directly connected to the bridge 1. Accordingly, a path cost to be added is only a path cost of the port 31 of the bridge 3 to which the GbE 10 is connected. It is recommended that this path cost be set inversely proportional to a physical link speed (physical band) as in the case of standard specifications (IEEE 802.1D/1w/1st) shown in FIG. 19. In fact, many Ethernet switches are designed so that values of FIG. 19 can be automatically set in the ports when the STP is operated. Thus, for the port of each bridge, 20 thousand should be set as a path cost because a physical link speed of the GbES 10 to 12 is 1 G[b/s]. Accordingly, a path cost set in the port 31 of the bridge 3 is 20 thousand, and a total path cost of the route [1] becomes 20 thousand.

On the other hand, in the route of [2], a path cost 20 thousand is first added in the port 21 of the bridge 2. Thus, 20 thousand has been set in a path cost field of the BPDU that reaches the bridge 3. A path cost 20 thousand of the port 32 of the bridge 3 is added to this value, and 40 thousand becomes a total path cost.

After the total path cost value has been determined for each route, the total path cost values of the routes are compared with one another, and the route of the smallest total path cost value is selected. In the network model shown in FIG. 18, a total path cost of the route [1] is 20 thousand, a total path cost of the route [2] is 40 thousand, and accordingly the route [1] is selected. As a result, the port 31 of the bridge 3 is selected as a STP tree to permit transfer of a data packet. On the other hand, the unselected port 32 of the bridge 3 is logically set in a blocking state to inhibit transfer of all the data packets.

As described above, based on path costs according to a physical band, the STP forms the tree in which a path cost is minimal. In other words, a scheme is employed in which a route of a band as wide as possible and having a small number of hops is selected as a tree.

Meanwhile, with popularization of wide-area Ethernet (registered trademark) services, the number of highly functional Ethernet switches capable of controlling bands has recently increased. Such a switch can create a logical link of a lower rate in a physical link by using a policer, a shaper, or the like. FIG. 20 shows policing and shaping operations at the bridges. For easier understanding of the description, only a direction from the bridge 1 to the bridge 2 will be considered.

The shaping is for forming a packet stream of a fixed rate or lower in the physical link, i.e., a logical link, by disposing a buffer in the bridge 1 which is a transmission side and limiting reading from the buffer. Thus, an input rate of the bridge 2 that is a reception side becomes equal to a shaping rate of the bridge 1.

The policing is for making the physical link substantially usable only at a policing rate or lower by limiting a communication rate of reception at the bridge 2 that is a reception side. In other words, even when transmission data from the bridge 1 is transmitted at a full wire rate, e.g., 1 G [b/s] of the GbE, packets of the policing rate or higher are discarded by a policing function operated at the bridge 2.

It is to be noted that a virtual port of each bridge for treating the logical link built by the shaping and the policing is referred to as a logical port. Each bridge can treat the logical port as an individual port in one physical port (logical ports 1 and 2 shown in FIG. 20).

The following problems are inherent in the conventional route selection using the STP when the logical link is built by using the highly functional Ethernet switches. FIG. 21 shows the route selection operation of the STP when the logical link is built in the network model shown in FIG. 18.

At the GbE 10, a logical link of 100 M[b/s] is built by shaping operated in the port 11 of the bridge 1. At the GbE 11, similarly, a logical link of 900 M[b/s] is built by shaping operated in the port 12 of the bridge 1. At the GbE 12, a logical link of 900 M[b/s] is built by policing operated in the port 32 of the bridge 3.

In the conventional route selection operation of the STP in such a case, only the physical link speed is taken into consideration as described above, and thus a result is substantially similar to that of the route selection. In other words, the port 31 of the bridge 3 is selected as a tree of the STP, while the port 32 of the bridge 3 is logically blocked.

Thus, a band that is substantially 100 M[b/s] in the GbE 10 is selected, while a band of 900 M[b/s] of the GbE 12 is blocked. In other words, in the conventional route selection operation of the STP, reference is made only to the physical link speed, and thus the tree is selected while a logical band that is a real link width is ignored. This results in selection of a communication band as wide as possible against the STP specifications.

The logical band is built in the physical band in such a manner, for example, when a plurality of users share the physical band. FIG. 22 shows an example of building a plurality of logical links in the network model shown in FIG. 18. In the example shown in FIG. 22, there are two users who wish to set a band between the bridges 1 and 3 (users 1 and 2 shown in FIG. 22), and both require a band of 900 M[b/s] at normal time and a spare band of 100 M[b/s].

When the plurality of users share the physical band as described above, each logical link is allocated to each user, and a spanning tree is built for each user. A MSTP (Multiple STP) or the like is available which can form an independent spanning tree (STI (Spanning Tree Instance)) for each user. According to the MSTP, an independent parameter for a path cost or the like can be provided for each STI, and thus a route different from one user to another can be selected. In other words, according to the MSTP, each user can block a different logical port. However, in the conventional method, a path cost value set as a default value based on the physical band is used. Thus, it is impossible to select a route different for each user.

As a method of avoiding the problem, there is a method involving calculating a path cost matching a logical link rate as shown in FIG. 23, and manually setting a path cost value at each bridge. In the case of using the MSTP, a proper path cost value is manually set at each port of the bridge for each STI as shown in FIG. 22.

However, the method necessitates manual calculation and input of a path cost for each bridge constituting the network. Besides, the logical link building method by the shaping necessitates not only checking of setting in the device but also checking work of opposite device setting because it is a port of the opposite device that is influenced by the path cost. Thus, in the setting of a proper path cost to enable route selection proper for the bridge constituting the network, problems are inherent, i.e., an increase in the number of work steps and complex work.

The following are related arts to the present invention.

[Patent document 1]
Japanese Patent Laid-Open Publication No. 11-177596

[Patent document 2]
Japanese Patent Laid-Open Publication No. 2004-140777

SUMMARY OF THE INVENTION

An object of the present invention is to provide a relay device for selecting a proper route.

The present invention adopts the following configuration to solve the above problems. That is, according to one aspect of the present invention, there is provided a relay device connected to a plurality of other relay devices through a plurality of physically different routes to constitute a network, including: a plurality of physical ports physically connected to the plurality of other relay devices on the network to form physical links; a setting unit setting one or more logical links each having a communication band equal to/lower than that of the physical link for each of the physical links; an evaluation unit automatically adding an evaluated value based on communication characteristics of the logical link when a control packet is received from a first relay device among the other relay devices through the logical link or the control packet is transferred to a second relay device through the logical link; and a unit selecting, when there are a plurality of routes from a start-point device among the other relay devices which becomes a transmission start point of the control packet to the relay device, one of the routes based on evaluated values accumulated by the relay devices included in the routes from the start-point device to the relay device.

With the present invention, one of the plurality of routes that merge at the relay device is selected by using the evaluated value compliant with the communication band of the logical band used for the routes from the start-point device which becomes the transmission start point of the control packet such as a BPDU on the network to the relay device.

Thus, according to the present invention, it is possible to automatically set a route evaluated value compliant with a logical link band which is a band used in a real operation, and to form a proper path while greatly reducing the number of steps necessary for a network operation.

According to another aspect of the present invention, in the relay device, when a first control unit is provided for controlling a band by limiting a reception rate of packets transmitted from the other relay devices connected to the logical link, the evaluation unit uses the reception rate at the logical link which receives the control packet as communication characteristics of the logical link for the control packet received through the logical link controlled by the first control unit.

With the present invention, when the communication band of the logical link is realized by limiting the reception rate to calculate the route evaluated value compliant with the communication band of the logical link, the evaluated value is obtained by using the reception rate as the communication band of the logical link.

Thus, according to the present invention, when the unit limiting the reception rate of the packets transmitted from the other relay devices is used as the band control method, it is possible to properly set the evaluated value compliant with the communication band of the logical link.

According to another aspect of the present invention, in the relay device, when a second unit is provided for controlling a band by limiting a transmission rate of packets transmitted to the other relay devices connected to the logical link, the evaluation unit adds to the control packet an evaluated value compliant with the transmission rate at the logical link if the logical link which transmits the control packet is controlled by the second control unit when the control packet is transferred.

With the present invention, when the logical band limits the transmission rate to realize the band control, the relay device pre-adds and sends the route evaluated value based on the evaluated value compliant with the transmission rate set at the target logical link during the control packet transmission. The relay device that receives the control packet adds the route evaluated value corresponding to a physical band of the physical link to a value set in the control packet.

Thus, according to the present invention, only by changing of the own relay device, it is possible to change the route evaluated value in the opposite port of the relay device substantially connected to the own relay device. Moreover, transmission rates do not need to be equal in both ends of the link, and it is possible to set an accurate route evaluated value in the band control of each direction.

According to another aspect of the present invention, in the relay device, when the control packet is received by the logical link in which the communication band is not set, the evaluation unit uses a value obtained by subtracting a communication band set at the other logical link set in the same physical link from a physical band of the physical link as communication characteristics of the logical link.

With the present invention, when a logical band is not set in the logical link used by the target route, an evaluated value is obtained according to the value obtained by subtracting the logical band set in the other logical link in the same physical link from the physical band.

Thus, according to the present invention, even when a logical link is not explicitly set, by subtracting a band reserved with the other logical link from the physical band, it is possible to select a path for selecting a route having a possibility of transmitting a large amount of data.

According to another aspect of the present invention, in the relay device, when a dividing unit is provided for dividing one of the logical links into one or more second logical links each having a communication band equal to/lower than that of the logical link, the evaluation unit uses a communication band of the logical link to which the second logical link receiving the control packet belongs as communication characteristics of the logical link for the control packet received through the second logical link.

With the present invention, when a plurality of logical links are further built in one logical link, an evaluated value is obtained according to a total band of logical bands of the plurality of logical links.

Thus, according to the present invention, even when a plurality of band reservations are used in one logical link, it is possible to select a proper route.

It is to be noted that the present invention may be a program for realizing any one of the functions. According to the present invention, such a program may be recorded in a computer readable storage medium.

According to the present invention, it is possible to provide a relay device for selecting a proper route.

BRIEF DESCRIPTION OF THE DRAWINGS

FIG. 3 is a diagram showing a band management table of a bridge 1;

FIG. 4 is a diagram showing a band management table of a bridge 3;

FIG. 9 is a diagram showing various path cost-related calculated values in the STI 1;

FIG. 10 is a diagram showing various path cost-related calculated values in the STI 2;

FIG. 13 is a diagram showing a band and path cost correspondence table;

FIG. 14 is a diagram showing the number of steps of operator's work when the present invention is applied;

FIG. 15 is a diagram showing the number of steps of operator's work at the bridge 1 when the present invention is not applied;

FIG. 16 is a diagram showing the number of steps of operator's work at a bridge 2 when the present invention is not applied;

FIG. 17 is a diagram showing the number of steps of operator's work at the bridge 3 when the present invention is not applied;

FIG. 18 is a diagram showing a route selection operation of a STP;

FIG. 19 is a diagram showing recommended path cost values defined according to IEEE 802. 1D/W/S;

DETAILED DESCRIPTION OF THE PREFERRED EMBODIMENTS

Figure 1:
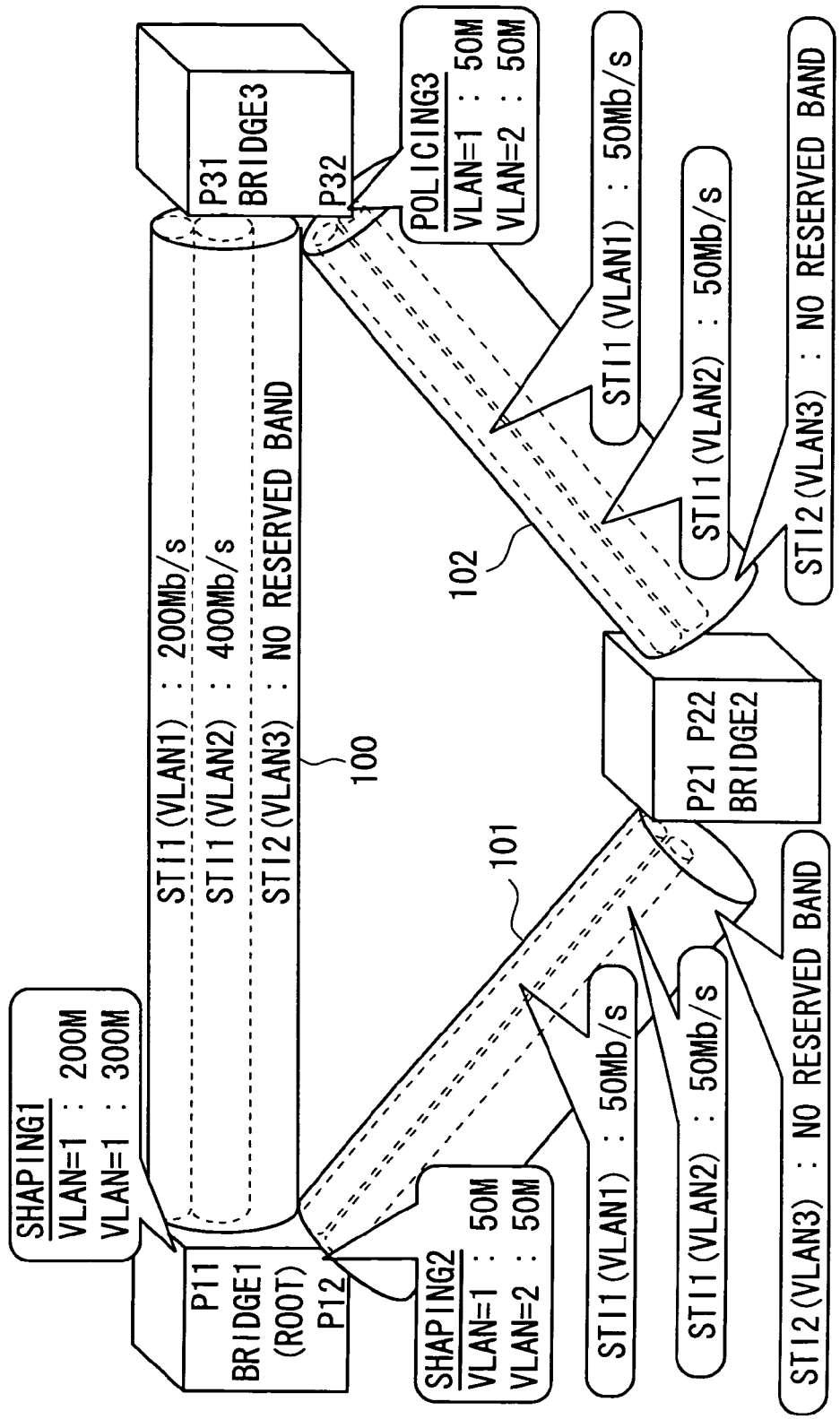
FIG. 1 is a diagram showing a network model according to an embodiment.

Hereinafter, referring to the drawings, a relay device according to a best mode (referred to as an embodiment, hereinafter) for implementing the present invention will be described. A configuration of the embodiment is illustrative but not limitative of the present invention.

<Network Model>

FIG. 1 shows a network model in the embodiment of the relay device of the present invention. Hereinafter, the network model configured by the relay device of the present invention will be described by using FIG. 1.

The network model shown in FIG. 1 includes three relay devices of the present invention (BRIDGES 1 to 3 shown in FIG. 1, and referred to as bridges hereinafter). The bridges are connected to Gigabit Ethernet (registered trademark) (links 100 to 102 shown in FIG. 1), and physical bands of the links 100 to 200 are 1 giga (G) [b/s] (bit per second).

Each of the bridges 1 to 3 includes a Central Processing Unit (CPU), a memory, an input/output interface, and the like. Each of the bridges 1 to 3 includes a plurality of physical ports for connection to the Gigabit Ethernet (registered trademark). In the network model of the embodiment, each bridge uses two physical ports (P11, 12, 21, 22, 31, and 32 shown in FIG. 1, and referred to as ports hereinafter). The bridges 1 to 3 control these ports, and relay packets by outputting communication packets input via a network cable via a network cable connected to the other physical ports. The bridge 1 is connected through the port 11 to the link 100, and an opposite of the link 100 is connected through the port 31 to the bridge 3. In other words, an opposite port of the port 11 of the bridge 1 becomes a port 31 of the bridge 3. Similarly, the bridge 1 is connected through the port 12 to the link 101, and an opposite of the link 101 is connected through the port 21 to the bridge 2. The bridge 2 is connected through the port 22 to the link 102, and an opposite of the link 102 is connected through the port 32 to the bridge 3.

Additionally, in the network model of the embodiment, with the bridge 1 set as a root, Multiple Spanning Tree Protocol (MSTP) is implemented at the bridges. By this MSTP, two spanning trees of Spanning Tree Instances (STI) 1 and 2 are formed at the bridges 1 to 3. Further, in the STI, a plurality of Virtual LAN's (VLANS 1, 2, and 3, hereinafter) used for identifying users are mapped. In the STI 1, two users of VLANS 1 and 2 are mapped, and a logical link (a reserved band) is built by a shaper or a policer for each VLAN. In the STI 2, a VLAN 3 is mapped, but no particular logical links are built.

In the description below of the embodiment, for easier understanding of explanation, reference will be made only to selection of a route from the bridge 1 as the root toward the bridge 3 (including a case of relaying through the bridge 2). However, the present invention is not limited to this. Selection of a route in a reverse direction, i.e., from the bridge 3 toward the bridge 1, can be realized by a similar method.

The VLAN 1 on the link 100 is mapped in a logical link of 200 mega (M) [b/s] built by a shaping (SHAPING) function of the bridge 1 (SHAPING 1 shown in FIG. 1). In other words, a shaping rate of 200 M[b/s] is set in the VLAN 1 (STI 1) of the port 11 of the bridge 1. A shaping rate of 400 M[b/s] is set in the VLAN 2 of the port 11. The VLAN 2 of the port 11 is mapped in a logical link of 400 M[b/s] compliant with the shaping rate.

Similarly, for the link 101, two logical links of 50 M[b/s] are formed by SHAPING 2 applied on the port 12. In other words, shaping rates of 50 M[b/s] are set in the VLANS 1 and 2 (STI 1) of the port 12, and the VLANS 1 and 2 of the port 12 are mapped in the logical links of 50 M[b/s] compliant with the shaping rates.

On the other hand, in the link 102, two logical links of 50 M[b/s] are built by a policing (POLICING) function (POLICING 3 shown in FIG. 1) applied on the port 32 of the bridge 3. The VLAN 1 and the VLAN 2 of the STI 1 are mapped in the logical links. In other words, the VLANS 1 and 2 of the link 102 are mapped in the logical links of 50 M[b/s] by setting a policing rate in the port 32 of the bridge 3.

<Functional Configuration of Relay Device>

Figure 2:
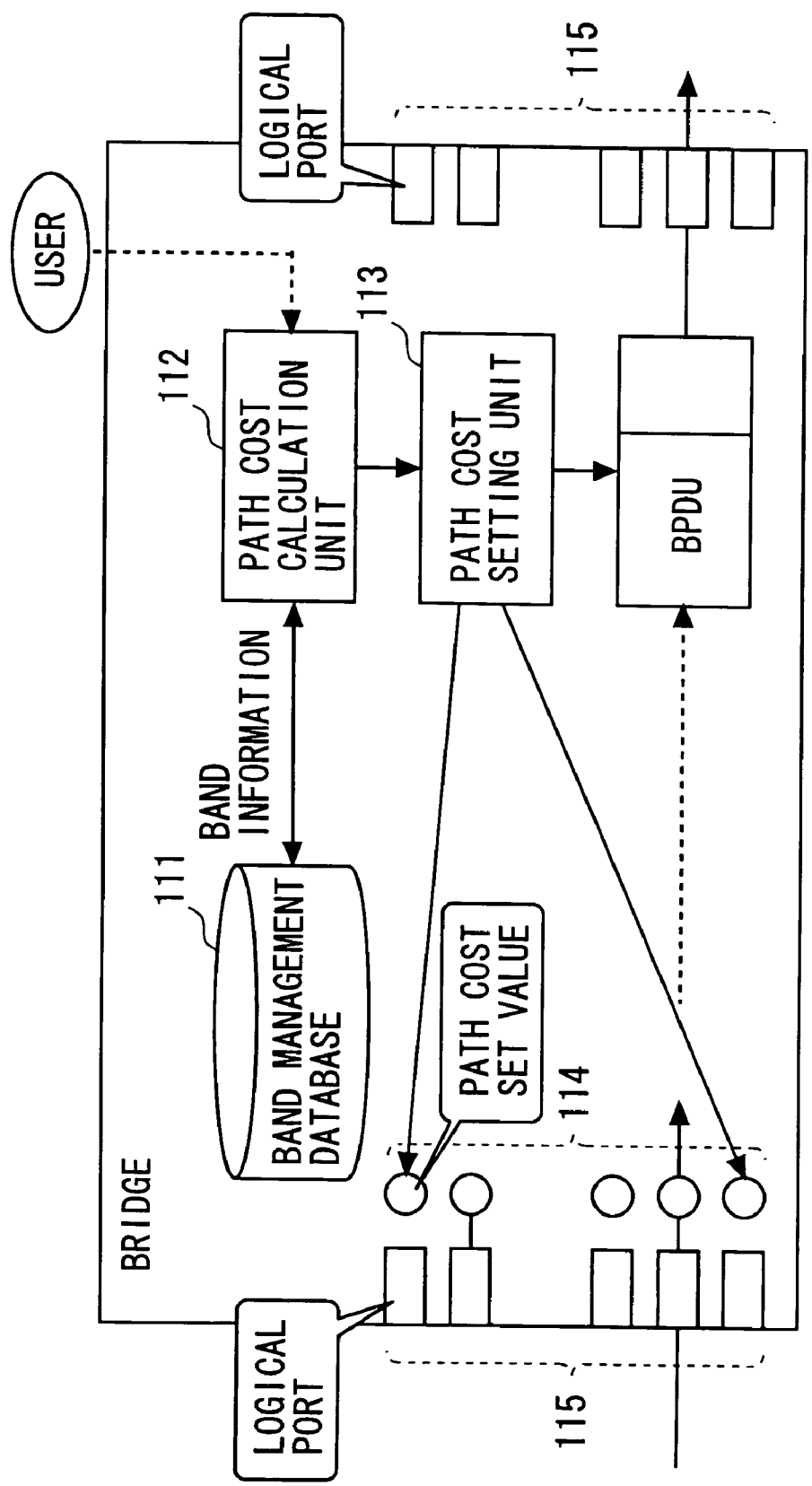
FIG. 2 is a diagram showing a functional configuration of a relay device according to the embodiment.

Next, a functional configuration of the relay device (bridges 1 to 3) of the embodiment will be described by using FIG. 2. FIG. 2 shows the functional configuration of the relay device of the embodiment. Functions described below are stored in the memory as, for example, programs, and controlled and executed by the CPU.

Each of the bridges 1 to 3 includes a band management database 111, a path cost calculation unit 112, and a path cost setting unit 113. In each of the bridges 1 to 3, a plurality of logical ports 115 can be set for each physical port, and a path cost set value 114 is provided for each of the plurality of logical ports 115. Upon reception of a BPDU, each of the bridges 1 to 3 adds the path cost set value 114 corresponding to the reception logical port to a path cost field of the BPDU. The bridge determines a blocking port based on this value.

The band management database 111 stores various settings necessary for implementing the MSTP. The band management database 111 contains band management tables shown in FIGS. 3 and 4. FIG. 3 shows the band management table provided in the bridge 1 of the embodiment. FIG. 4 shows the band management table provided in the bridge 3. In the band management table of the bridge 1 shown in FIG. 3, a shaping rate is set for the logical link of each physical port. The VLAN 3 in which a shaping rate is not set indicates that a logical link is not built. On the other hand, in the band management table of the bridge 3 shown in FIG. 4, a policing rate is set for each logical link of the port 32. In the port 31, a logical link is built by the shaping of the bridge 1. Thus, policing is not executed and the port is in an unset state.

In the case of setting the logical links, equal shaping rates are frequently set in both ports connected to the same link to maintain band symmetry. In other words, for communication from the bridge 3 toward the bridge 1, a value equal to that of the bridge 1, i.e., 200 M[b/s], is set (not shown) as a shaping rate in the VLAN 1 of the port 31 in the band management table of the bridge 3. However, in the description, since reference is made only to the route selection from the bridge 1 toward the bridge 3, explanation of a logical link of such a reverse direction is omitted. Similarly, for the bridge 2, regarding communication from the bridge 1 toward the bridge 3, neither policing nor shaping is operated, and thus a band management table of the bridge 2 is not necessary.

The path cost calculation unit 112 calculates a path cost of each logical port based on logical band information or the like of each port input from the user. The path cost calculation unit 112 sets the logical band information input from the user, e.g., a shaping rate and a policing rate, in the band management database 111. To calculate the path cost, the path cost calculation unit 112 refers to the band management database 111. The calculated path cost value is input to the path cost setting unit 113.

The path cost setting unit 113 sets the path cost value calculated by the path cost calculation unit 112 to be a path cost set value 114 of each logical port. Additionally, the path cost setting unit 113 adds a predetermined path cost value (path cost set value 114) calculated by the path cost calculation unit 112 to a path cost field of a sent BPDU.

<Path Cost Calculation Method>

The patch cost calculation process by the path cost calculation unit 112 is performed for each STI built in each bridge. The path cost is obtained according to a logical band allocated to the STI. The path cost calculation unit 112 of the embodiment calculates a path cost by the following formula based on a recommended path cost value defined according to the STP standard specifications shown in FIG. 19 (IEEE 802. 1D/w/s)

Path cost value=20,000,000/logical link band [Mb/s]

In the network model of the embodiment shown in FIG. 1, the STI 1 is mapped in the two users of the VLANS 1 and 2. Accordingly, a path cost is calculated by the formula with a total value of bands allocated to the VLANS 1 and 2 set as a logical band of the STI 1. In other words, for the STI 1 of the link 100, 600 M[b/s] that is a total value of 200 M[b/s] of the VLAN 1 and 400 M[b/s] of the VLAN 2 becomes a logical band. Similarly, for the STI 1 of the link 101, 100 M[b/s] that is a total value of 50 M[b/s] of the VLAN 1 and 50 M[b/s] of the VLAN 2 becomes a logical band. For the STI 1 of the link 3, 100 M[b/s] that is a total value of 50 M[b/s] of the VLAN 1 and 50 M[b/s] of the VLAN 2 becomes a logical band.

<Operation Example>

Figure 5:
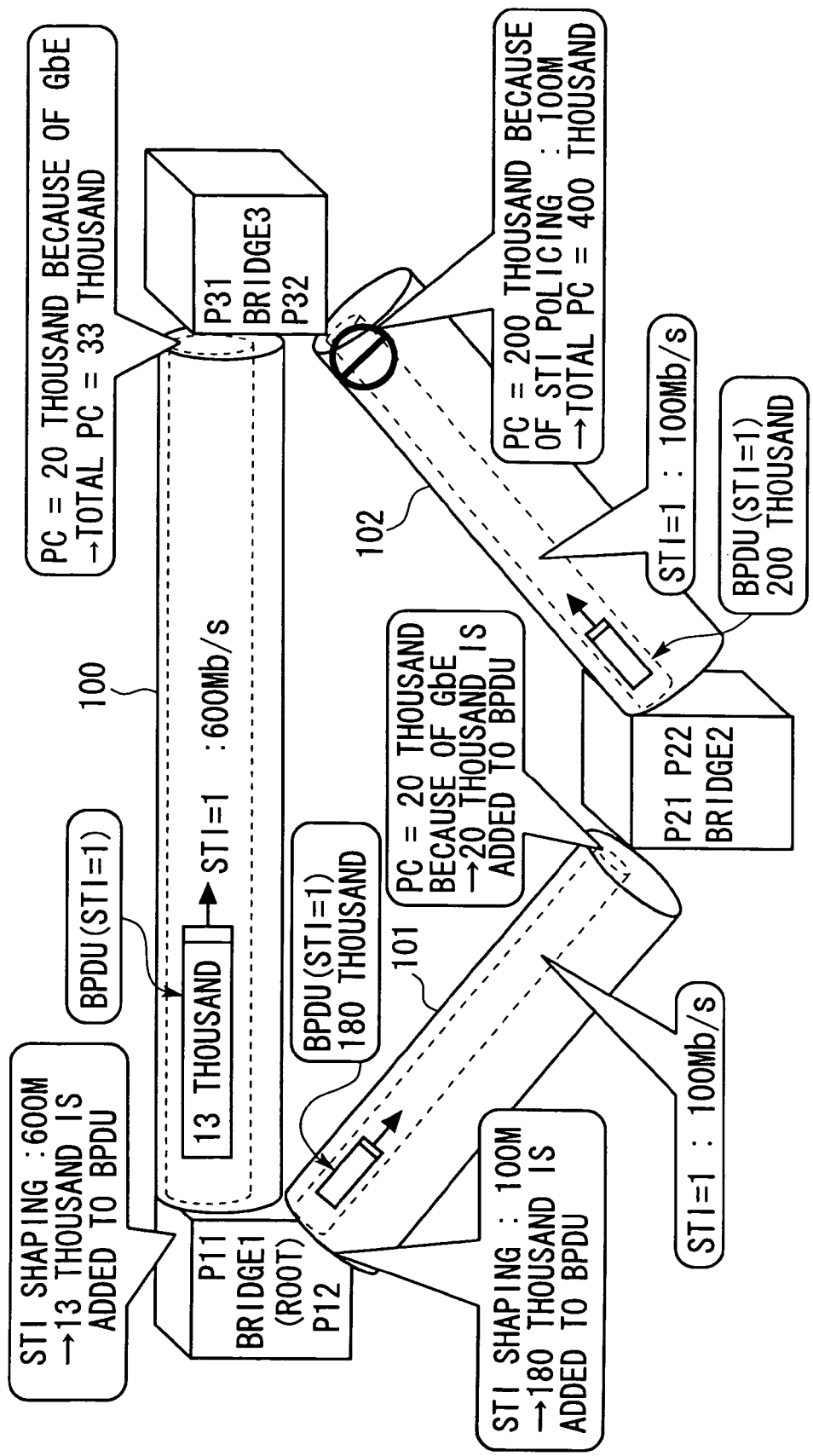
FIG. 5 is a diagram showing a route selection operation of a STI 1.
Figure 6:
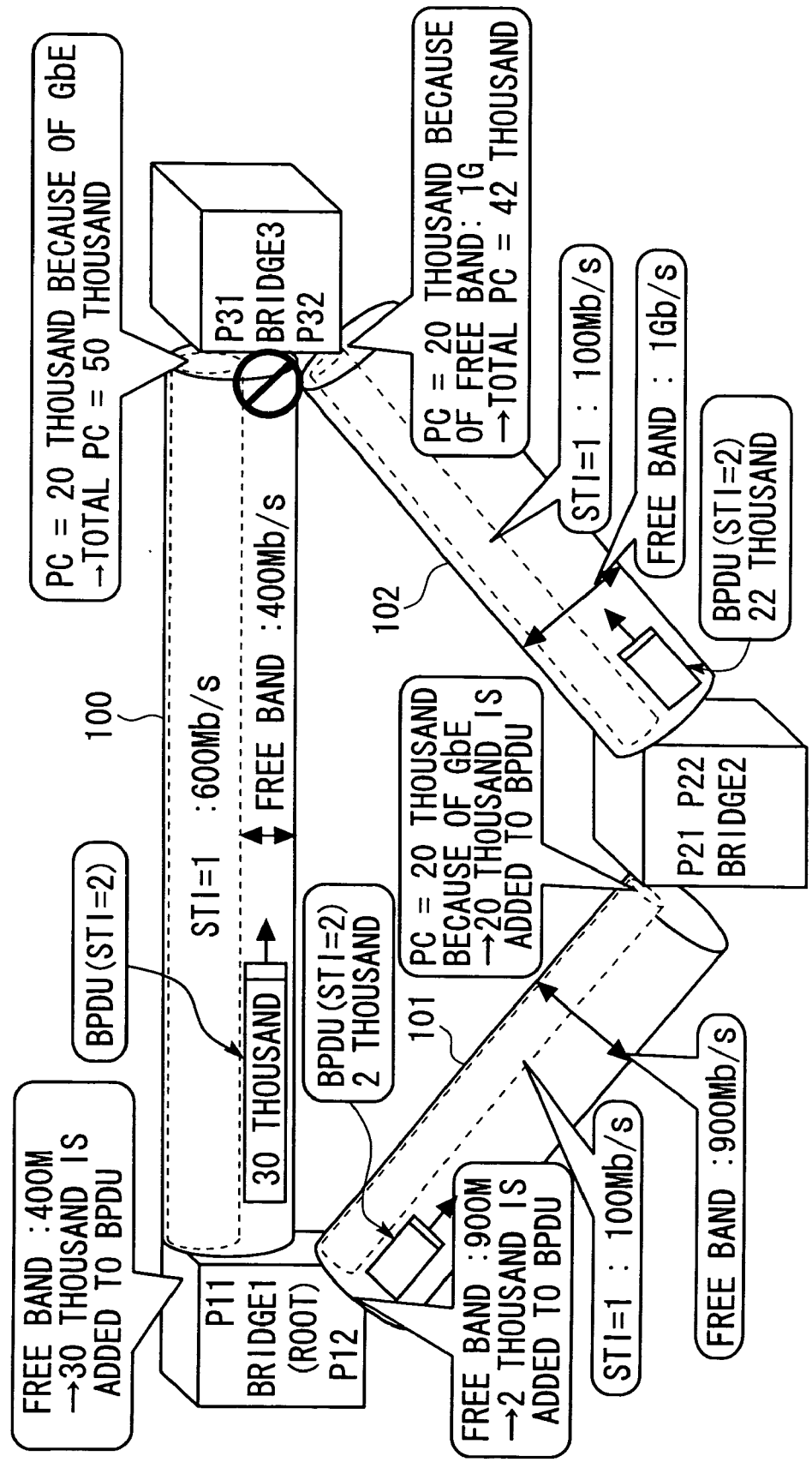
FIG. 6 is a diagram showing a route selection operation of a STI 2.

Next, operations of the path cost calculation unit 112 and the path cost setting unit 113 will be described by using FIGS. 5 and 6. FIG. 5 shows a route selection operation of the STI 1 regarding the network model of the embodiment shown in FIG. 1. FIG. 6 shows a route selection operation of the STI 2 regarding the network model of the embodiment shown in FIG. 1.

The path cost calculation process by the path cost calculation unit 112 varies depending on logical band building means of each bridge. Thus, the path cost calculation process by the path cost calculation unit 112 will be described with the logical band building of each bridge classified into a case carried out by a shaper and a case carried out by a policer.

<<Logical Band Building by Shaper>>

A path cost calculation process when logical links interconnecting the bridges are built by shapers of the bridges will be described by using FIG. 5. The links 100 and 101 and the STI 1 shown in FIG. 5 correspond to this case. For the STI 1 of the link 100, a logical band of 600 M[b/s] that is a total value of the VLANS 1 and 2 is built as described above. For the STI 1 of the link 101, a logical band of 100 M[b/s] is built.

Ordinarily, in the MSTP, a total path cost value of a target port is obtained by adding a path cost value of its port at the bridge of the BPDU input side to a path cost field of the BPDU. However, as in the case of the STI 1 of the link 100 shown in FIG. 5, shaping at the bridge 1 means that an input rate of the port 31 of the bridge 3 which is an opposite port thereof is limited to its shaping rate. In other words, a path cost influenced when the shaping rate of the bridge 1 is adjusted is a path cost of the port of the bridge 3.

It is accordingly desired that when the link 100 is shaped to 600 M[b/s] at the bridge 1, a path cost value originally added at the port of the bridge 3 be set to about 33 thousand (=20,000,000 /600). However, the bridges 1 and 3 are different devices. Thus, to know a shaping rate set at the bridge 1, the bridge 3 must change setting across the bridge devices.

Thus, while a path cost value of the bridge 3 is maintained as a default value, i.e., not changed from 20 thousand corresponding to a physical band (1 G[b/s]), a value (about 13 thousand) obtained by subtracting a path cost value (20 thousand) of a physical band from a path cost value (about 33 thousand) of a logical band is added beforehand to the BPDU sent from the bridge 1. Accordingly, at the bridge 3, a total becomes about 33 thousand because of the addition of 20 thousand as the default value, which is similar to a result when a path cost value is set to about 33 thousand for the target port of the bridge 3. Needless to say, no particular setting change is necessary for the bridge 3 as a series of accompanying operations are confined in the bridge 1.

In other words, when the logical links for interconnecting the bridges are built by the bridge shapers, a problem occurs because the target bridge of the input side does not know a band of the target logical band. By the method, however, the problem can be dealt with based on control by the bridge of the side in which a shaping rate is set.

A process is similar for the STI 1 of the link 101. That is, the bridge 1 adds a value (180 thousand) obtained by subtracting a path cost (20 thousand) of a physical band from a path cost value (200 thousand) of a logical band to a BPDU sent from the port 12 of the bridge 1 based on a shaping rate 100 M[b/s] set in the port 12. The bridge 2 adds 20 thousand as a default value to a path cost field of the received BPDU, and a total path cost value becomes 200 thousand.

<<Logical Band Building by Policer>>

Next, a path cost calculation process when logical links for interconnecting the bridges are built by bridge policers will be described by using FIG. 5. The STI 1 of the link 102 shown in FIG. 5 corresponds to this case.

When the logical links for interconnecting the bridges are built by the bridge policers, a path cost of each of the logical links is calculated based on a policing rate set in the port of its bridge. It is because a logical band of a target logical link is determined by the policing rate. In this case, a path cost set value 114 set as a default value based on a physical band is changed to a value according to the policing rate.

Thus, at the bridge 3, a path cost value 200 thousand (=20,000,000/100) corresponding to a policing rate 100 M[b/s] set in the port 32 of the bridge 3 is added to a BPDU.

<<Case in which Logical Band is Not Set>>

Here, a path cost calculation process when a logical band is not set in a STI built at each bridge will be described by using FIG. 6. The STI 2 shown in FIG. 6 corresponds to this case.

In this case, the path cost calculation process is carried out with a band obtained by subtracting a band reserved in the STI (STI 1) other than the target STI from a physical band set as a logical band of the STI (STI 2). In other words, in the link 100 shown in FIG. 6, the STI 1 on the same link builds a logical band of 600 M[b/s], and a band 400 M[b/s] obtained by subtracting this logical band from the physical band is regarded as a logical band of the STI 2. It is because since the STI 2 is not under any band control, the STI 2 can use only a remaining band when traffic of the DTI 1 flows to the link 100, and this link has a possibility that a band will be potentially reduced for the STI 2.

Thus, in the STI 2 of the port 11 of the bridge 1, assuming that a shaping rate is set to 400 M[b/s], the process is carried out thereafter by the same method as that for the logical band building by the shaper. That is, the bridge 1 adds a value (30 thousand) obtained by subtracting a path cost value (20 thousand) of the physical band from a path cost value (50 thousand) of 400 M[b/s] beforehand to a BPDU to be sent. Then, at the bridge 3, a total becomes 50 thousand because of the addition of 20 thousand as a default value, which is similar to a result when a path cost value 50 thousand in which the logical band corresponds to 400 M[b/s] is set at the bridge 3.

A process is similar for the link 101. That is, as a logical band of 100 M[b/s] is set as the STI 1 in the port 12 of the bridge 1, a logical band of the STI 2 is assumed to be 900 M[b/s] and processed. Thus, for the STI 2 of the link 101, the bridge 1 adds a value (about 2 thousand) obtained by subtracting a path cost value (20 thousand) of the physical band from a path cost value (about 22 thousand) of the logical band to a BPDU sent to the link 101. Accordingly, at the bridge 2, a total becomes 22 thousand because of the addition of 20 thousand, which is similar to a result when about 22 thousand as a path cost value corresponding to the logical band 900 M[b/s] is set in the bridge 2.

On the other hand, a process for the STI 2 of the link 102 is slightly different. For the link 102, the policer of the STI is operated in the port 32 of the bridge 3. This policing function can limit a band input to the bridge 3, but does not have a nature of guaranteeing a band because it does not perform control to prevent sending of a communication packet from the bridge 2 across the bands. Accordingly, in the link 102, no particular band is reserved by the STI 1. In such a case, a logical band is assumed to be 1 G[b/s], and the path cost calculation process is carried out.

Thus, in the STI 2 of the port 32 of the bridge 3, its own policing rate is assumed to be 1 G[b/s] and processed. In other words, at the bridge 3, for the STI 2 on the link 102, a path cost value (20 thousand) corresponding to the logical band 1 G[b/s] is added as its own path cost value.

(Description of Operation Flow of Each Function)

Next; operation flows of the-path cost calculation unit 112 and the path cost setting unit 113 will be described below by using FIGS. 7 and 8. As described above, the path cost calculation process varies depending on which of the policing and the shaping is applied on each port of the bridge. When seen as processes of the path cost calculation unit 112 and the path cost setting unit 113 in each of the bridges 1 to 3, this is largely classified into a process of changing the path cost set value 114 and a process of pre-adding a predetermined path cost value to the BPDU when the BPDU is transmitted. Each process will be described below.

Figure 7:
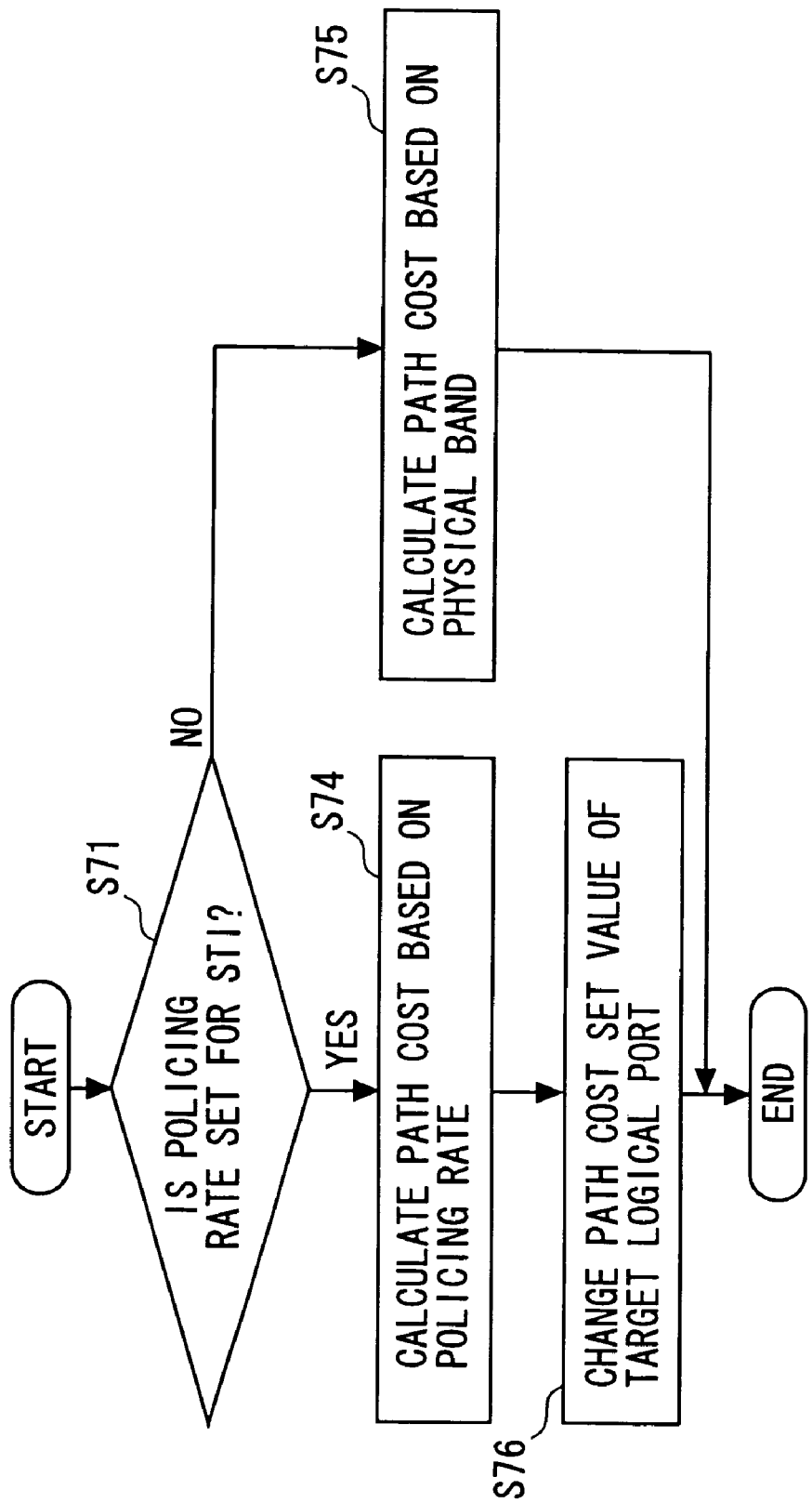
FIG. 7 is a flowchart showing a process of changing a path cost set value.

FIG. 7 is a flowchart showing a process of changing path cost set values for the path cost calculation section 112 and the path cost setting unit 113. In the path cost set value 114 of the bridge, at first, a path cost value (20 thousand corresponding to GbE of the embodiment) based on a physical band is set as a default value. The process of changing this value is shown in FIG. 7.

First, when a logical band is set in the STI of the bridge by a network operator, the path cost calculation unit 112 of the bridge judges whether the set band is setting of a policing rate or not (S71). If the setting is a policing rate (S71; YES), the path cost calculation unit 112 calculates a path cost value corresponding to the policing rate (S74). On the other hand, if the setting is not a policing rate (S71; NO), a path cost value corresponding to a physical band set as a default is calculated (S75). Then, the path cost value calculated by the path cost calculation unit 112 is set to be a path cost set value 114 of a target port by the path cost setting unit 113 (S76).

Accordingly, a path cost set value is automatically set and changed for each logical port of the bridge. Then, the bridge that has received a BPDU adds the path cost set value to its path cost field.

Figure 8:
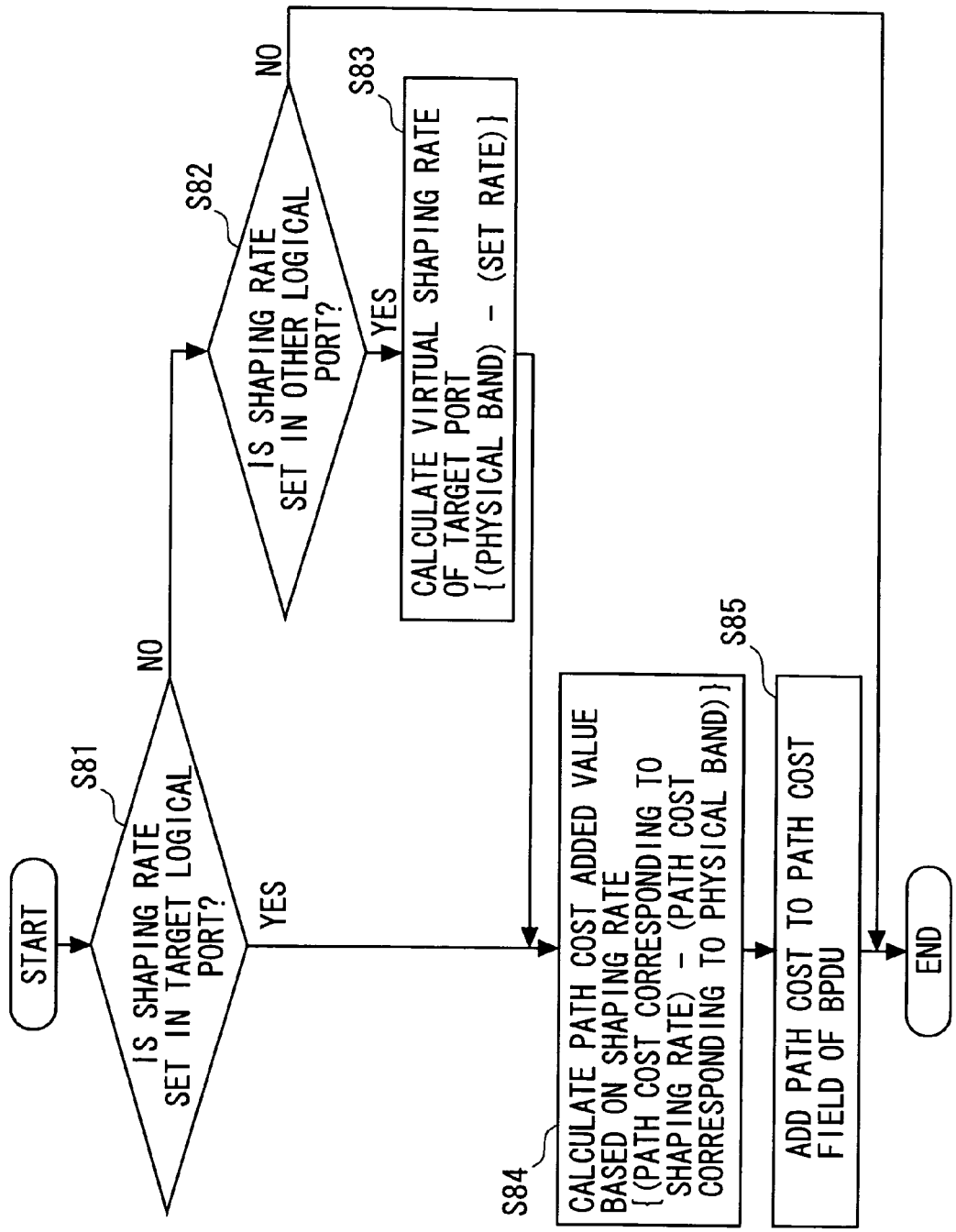
FIG. 8 is a flowchart showing a process of adding a path cost during BPDU transmission.

FIG. 8 is a flowchart showing a process of adding a path cost value during BPDU transmission for the path cost calculation unit 112 and the path cost setting unit 113. When a target logical port is built by shaping, a predetermined path cost value is added beforehand when the BPDU is sent.

When the BPDU is sent from the bridge, the path cost calculation unit 112 refers to the band management database 111 to determine whether a shaping rate has been set or not in a target STI (logical port) which sends the BPDU (S81). Here, if a shaping rate has not been set in the target STI (S81; NO), the path cost calculation unit 112 determines whether a shaping rate has been set or not in the other STI (S82). If a shaping rate has been set in the other STI (S82; YES), the path cost calculation unit 112 calculates a value obtained by subtracting a logical band set in the other logical port from a physical band of the port as a virtual shaping rate (S83). Then, the path cost calculation unit 112 calculates a path cost added value which is a value obtained by subtracting a path cost value corresponding to the physical band to which the target port belongs from a path cost value corresponding to the shaping rate or the virtual shaping rate of the target port (S84). Then, the path cost setting unit 113 adds this path cost added value to a path cost field of the BPDU to be sent (S85). (Description of route selection operation of MSTP in network model)

By the operation of each functional unit of the bridge, in the network model of the embodiment shown in FIG. 1, the following route selection, i.e., a spanning tree, is formed. Hereinafter, a route selection operation of the MSTP regarding two routes, i.e., [1] a route through the link 100 and [2] a route via the bridge 2 (route through the links 101 and 102) from the bridge 1 to the bridge 3, in the network model of the embodiment shown in FIG. 1 will be described by using FIGS. 5, 6, 9, and 10. FIG. 9 shows a calculation result of each bridge regarding route selection in the STI 1 of the network model. FIG. 10 shows a calculation result of each bridge regarding route selection in the STI 2 of the network model.

First, the STI 1 will be described. A reserved band of each link, a corresponding path cost, and a path cost value added to the path cost field of the BPDU in the STI 1 are as shown in FIG. 9.

For the route of [1], the bridge 1 sends a BPDU to which about 13 thousand has been added toward the bridge 3. Then, the bridge 3 adds a path cost 20 thousand corresponding to a physical band in the port 31. As a result, a total path cost of the route [1] becomes about 33 thousand. In other words, a path cost value corresponding to 600 M[b/s] that is a logical band of the STI is automatically set at the bridge 3.

On the other hand, for the route of [2], the bridge 1 sends a BPDU to which 180 thousand has been added toward the bridge 2. The bridge 2 that has received the BPDU adds a path cost 20 thousand corresponding to a physical band of a target port, and directly sends the BPDU toward the bridge 3. A path cost value set in the path cost field of the BPDU is 200 thousand. The bridge 3 that has received the BPDU adds the path cost value of 200 thousand from a policing rate set in the port 32. As a result, a total path cost of the route [2] becomes 400 thousand.

When a total path cost value is determined for each route, the total path costs of the routes are compared with one another, and a route of a low total path cost value is selected. In the example shown in FIG. 5, a total path cost of the route [1] is about 33 thousand, a total path cost of the route [2] is 400 thousand, and thus the route [1] is selected. As a result, the port 31 of the bridge 3 is selected as a STP tree to permit transfer of data packets. On the other hand, the unselected port 32 of the bridge 3 is logically set in a blocking state to inhibit transfer of all data packets.

Next, the STI 2 will be described. A logical band is not set in the STI 2, and thus a band excluding bands reserved in the STI other than the STI 2 is assumed to be a logical band. Accordingly, a logical band of each link, a corresponding path cost, and a value added to a path cost field of a BPDU are as shown in FIG. 10.

Thereafter, a process similar to that of the STI 1 will be carried out. For the route of [1], the bridge 1 sends a BPDU to which 30 thousand has been added toward the bridge 3. Then, the bridge 3 adds a path cost 20 thousand corresponding to a physical band of the port 31. As a result, a total path cost of the route [1] becomes 50 thousand. In other words, a path cost value corresponding to 400 M[b/s] that is a logical band of the STI is automatically set in the bridge 3.

On the other hand, for the route of [2], the bridge 1 sends a BPDU to which about 2 thousand has been added toward the bridge 2. The bridge 2 that has received the BPDU adds a path cost 20 thousand corresponding to a physical band of a target port, and directly sends the BPDU toward the bridge 3. A path cost value set in a path cost field of the BPDU at this time is about 22 thousand. The bridge 3 that has received the BPDU adds a path cost value of 20 thousand corresponding to 1 G[b/s] because of a policing rate set in the port 32. As a result, a total path cost of the route [2] becomes about 42 thousand.

When a total path cost value is determined for each route, the total path cost values of the routes are compared with one another, and a route of a low total path cost value is selected. As shown in FIG. 6, a total path cost of the route [1] is 50 thousand, a total path cost of the route [2] is about 42 thousand, and thus the route [2] is selected. As a result, the port 32 of the bridge 3 is selected as a tree of the STI to permit transfer of data packets. On the other hand, the unselected port 31 of the bridge 3 is logically set in a blocking state to inhibit transfer of all data packets.

In short, optimal route selection for each STI (logical band) is realized by automatically setting a path cost value at each bridge.

<Operation Effects of the Embodiment>

In the bridge of the embodiment, the plurality of spanning trees are built by using the path cost compliant with the logical band mapped in the STI.

Thus, the path cost compliant with the logical link band which is a band used in real operation can be automatically set, the number of steps necessary for the network operation can be greatly reduced, and a proper spanning tree can be formed.

To calculate the path cost according to the logical band, when the logical band is realized by policing, the path cost value is obtained with this policing rate set as a logical band.

Accordingly, when the policer is used as a band control method, it is possible to properly set a path cost according to the logical band.

When the logical band is realized by the shaping, each bridge pre-adds and sends a path cost value compliant with a value obtained by subtracting the physical band from the logical band with the shaping rate set in the target logical link set as a logical band during BPDU transmission. The bridge that has received this BPDU adds the path cost value corresponding to the physical band of the physical link to the value set in its path cost field.

Thus, only by changing of the own bridge, it is possible to substantially change a path cost in the opposite port of the bridge connected to the own bridge. Moreover, shaping rates do not need to be equal in both ends of the link, and an accurate path cost can be set in shaping of each direction.

When a logical band is not set in the target STI, the path cost value compliant with the value obtained by subtracting the logical band set in the other logical link in the same physical link from the physical band is obtained.

Thus, even when the logical link is not explicitly set, by subtracting the band reserved in the other STI from the physical band, it is possible to build a spanning tree which enables selection of a route having a possibility of sending much more data.

When a plurality of logical links are mapped in one spanning tree, a path cost value compliant with a total band of the logical bands of the plurality of logical links is obtained.

Thus, even when a plurality of band reservation users are mapped in one STI, it is possible to select a proper route.

Furthermore, to calculate the path cost, the predetermined calculation formula (path cost value=20,000,000/logical link band [Mb/s]) in which the logical band is an input is used.

Thus, without consuming the memory capacity, it is possible to build a bridge for calculating a proper path cost.

As described above, by carrying out the path cost calculation process based on the band control method of the logical link between the bridges, the proper path cost compliant with the logical band of the logical link used in real operation is calculated, making it possible to form a proper spanning tree.

<Modified Example>

A modified example of the relay device according to the embodiment of the present invention will be described. In the modified example shown below, only the relevant functions of the embodiment are replaced, and other functions, configurations and the like are similar.

<<Modified Example 1 of Path Cost Calculation Process>>

First, a modified example (referred to as Modified Example 1, hereinafter) of the path cost calculation process performed by the path cost calculation unit 112 of the relay device of the embodiment will be described below. It is a modified example of the path cost calculation process when the logical band is built by the shaper.

In the embodiment of the present invention, when the BPDU is sent, the value obtained by subtracting the path cost value of the logical band from the path cost value of the physical band is added beforehand, and the bridge that has received the BPDU adds the patch cost value according to the physical band set as a default. Thus, the setting similar to the presetting of the path cost value of the port of the BPDU receiving side to the value corresponding to the logical band is realized.

According to Modified Example 1, when a shaping rate is set for a target logical port, a path cost set value 114 of the port is changed to a value corresponding to the shaping rate.

Figure 20:
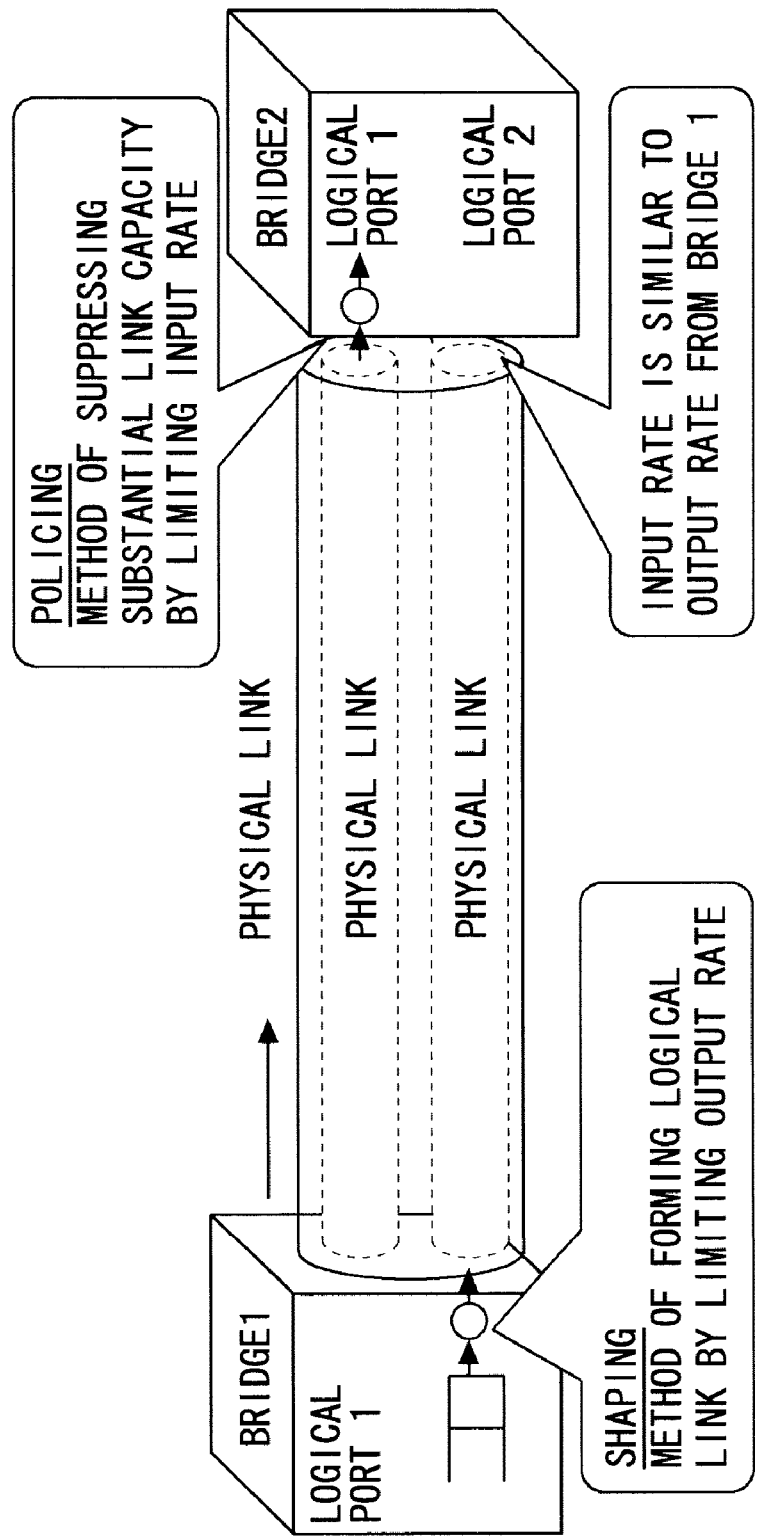
FIG. 20 is a diagram showing policing and shaping operations.
Figure 21:
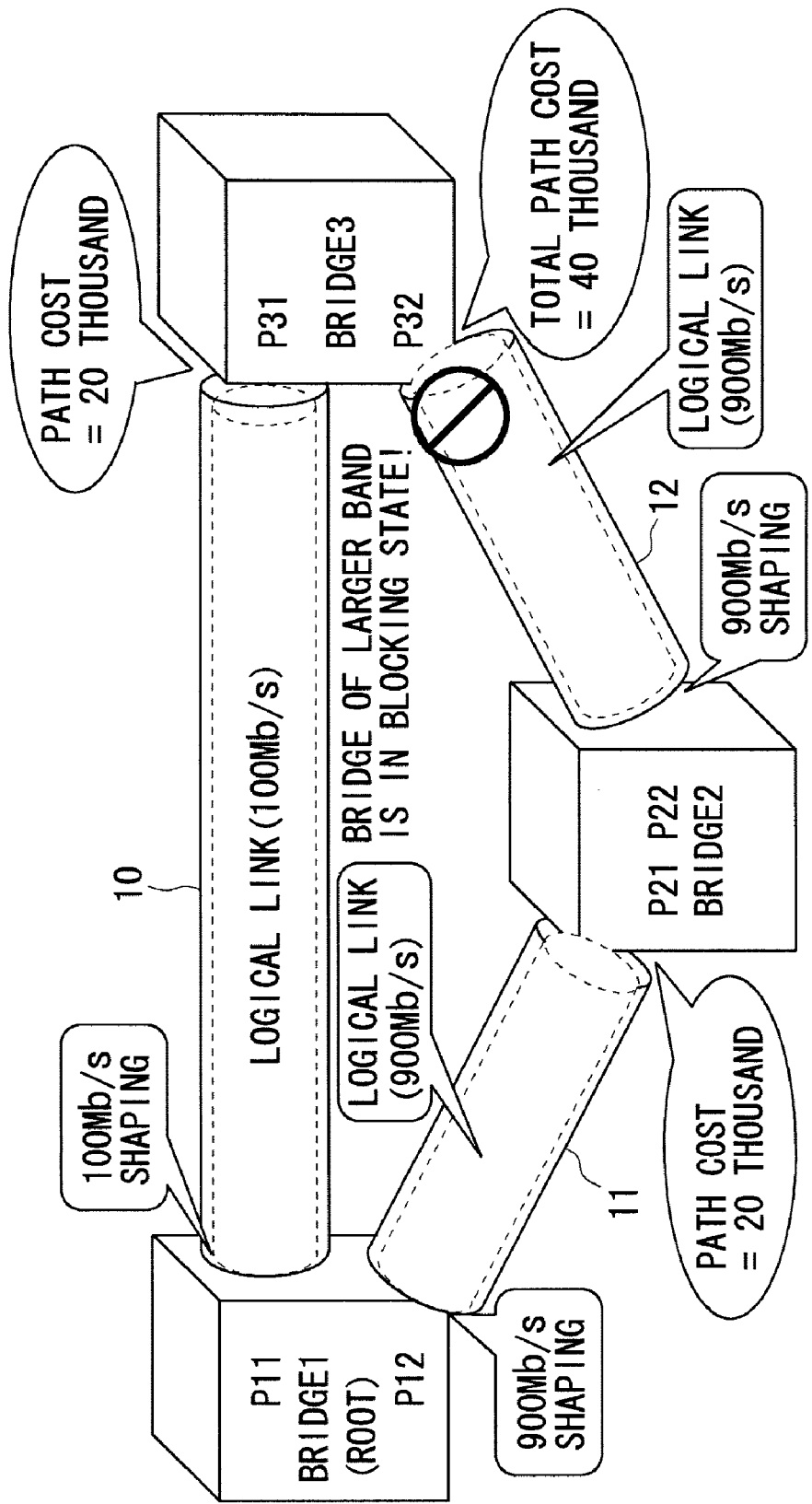
FIG. 21 is a diagram showing a route selection operation of the STP when a logical link is built.
Figure 22:
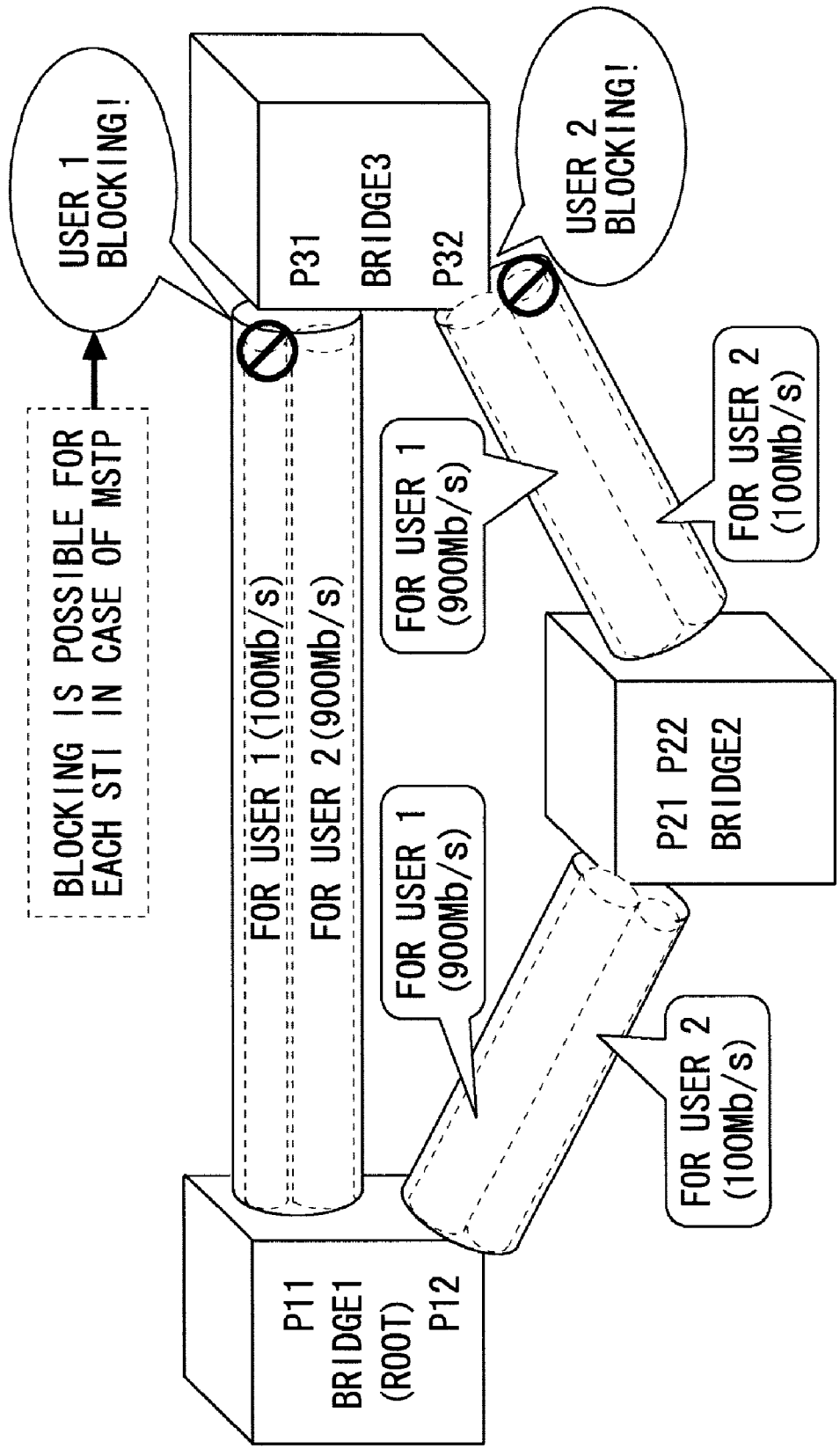
FIG. 22 is a diagram showing an example in which a plurality of logical links are used.
Figure 23:
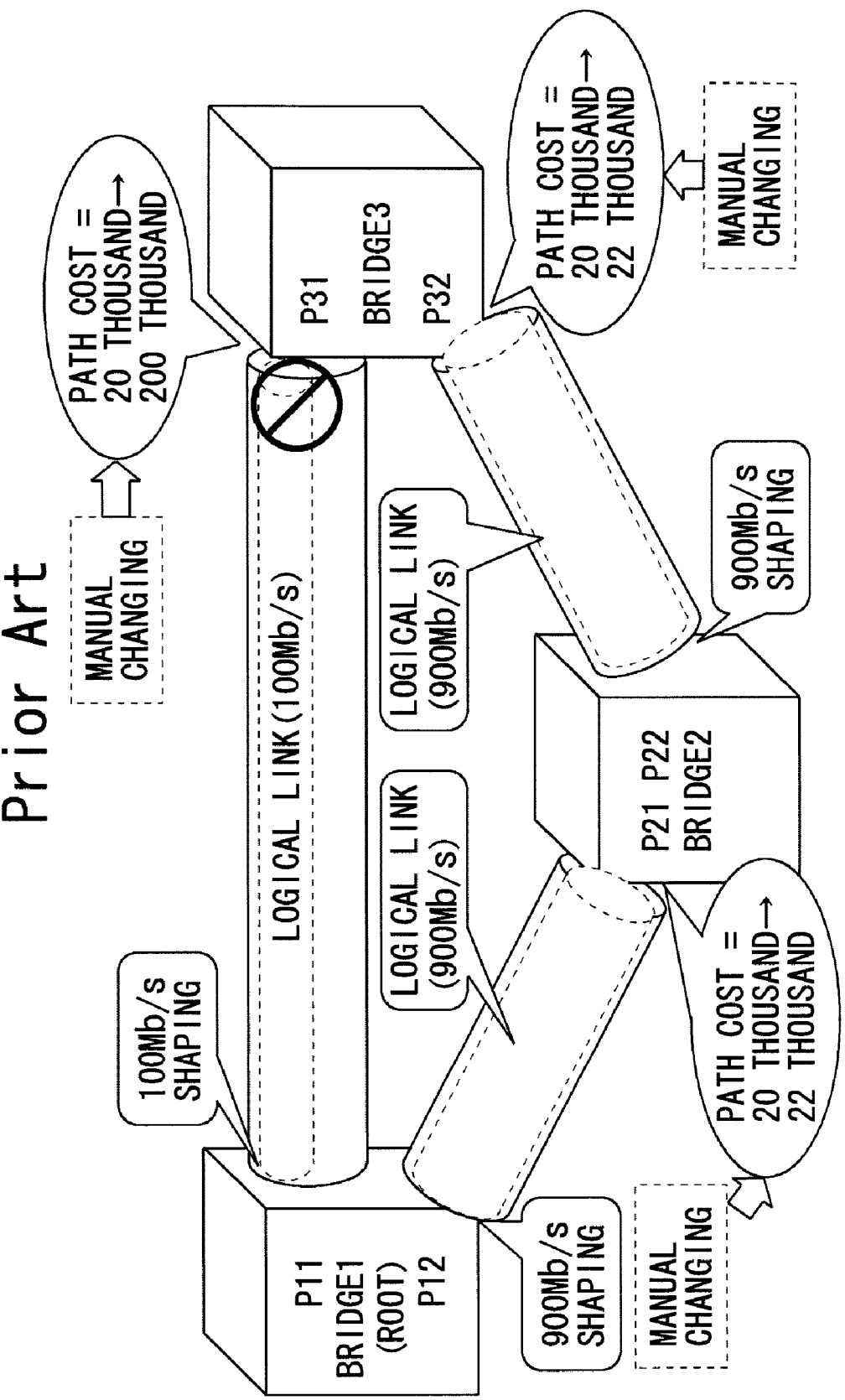
FIG. 23 is a diagram showing manual path cost changing.

As shown in FIG. 20, when shaping is applied by the port of the bridge 1, the shaping originally means limiting of an input to the logical port of the bridge 2 that is its opposite port. Accordingly, even when a shaping rate is set in the port of the bridge 1, an input rate of the logical link of a reverse direction (direction of input to the bridge 1) corresponding to a logical link thereby built (direction of sending to the bridge 2) does not necessarily become equal to the shaping rate set in the port of the bridge 1. However, in the case of setting a logical link, equal shaping rates are frequently set in both ports connected to the same link to maintain band symmetry. In such a case, since a shaping rate of an own port is equal to that of the opposite port, reference to the shaping rate of the own port is similar to reference to the shaping rate of the logical link input to the own port. Thus, a proper path cost can be set.

An operation of the path cost calculation unit 112 of Modified Example 1 will be described by using FIGS. 5 and 6. Regarding the STI 1, for example, in the case of the link 100 shown in FIG. 5, according to the embodiment, the path cost value of about 13 thousand is added beforehand to the path cost field of the BPDU sent from the bridge 1. According to Modified Example 1, however, this process is not carried out. In Modified Example 1, it is assumed that shaping is carried out at the port 31 and its shaping rate is equal to that of the port 11. Thus, when the BPDU is received, the path cost calculation unit 112 of the bridge 3 refers to setting of a shaping rate of a reverse direction for the port 31, and adds a path cost value corresponding to the rate, i.e., a path cost value of about 33 thousand corresponding to 600 M[b/s]. Thus, a result is similar to that of the execution of the embodiment.

An operation when a logical band is not set for reservation in a target STI in Modified Example 1 will be described below. When a logical band is not set for reservation in the target STI, first, as in the case of the embodiment, a band obtained by subtracting a band reserved in other than the target STI from a physical band is regarded as a logical band of the STI.

Thereafter, as in the case of the operation, at the bridge that has received a BPDU, a path cost value corresponding to a shaping rate assumed to be set in a reverse direction of its target logical port is set. Regarding the STI 2, for example, in the case of the link 100 shown in FIG. 6, according to the embodiment, a path cost field of 30 thousand corresponding to a free logical band 400 M[b/s] is added beforehand to a path cost field of the BPDU sent from the bridge 1. According to Modified Example 1, however, this process is not carried out. In Modified Example 1, when the BPDU is received, the path cost calculation unit 112 of the bridge 3 refers to setting of a shaping rate of a reverse direction for the port 31, and adds a path cost value corresponding to the rate, i.e., a path cost value 50 thousand corresponding to 400 M[b/s].

Figure 11:
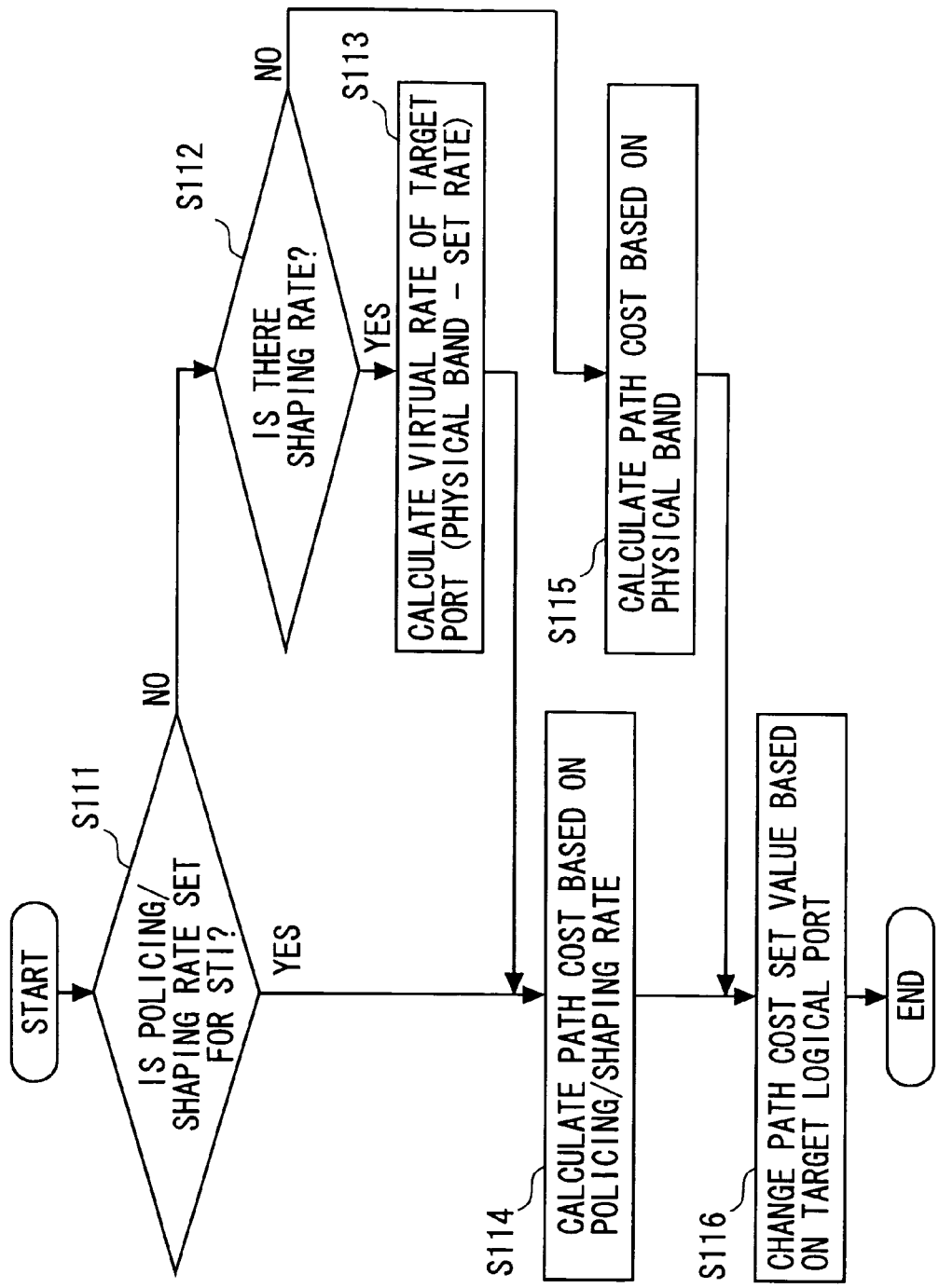
FIG. 11 is a flowchart showing a process of changing a path cost set value according to Modified Example 1.

Next, a process of changing path cost set values of the path cost calculation unit 112 and the path cost setting unit 113 according to Modified Example 1 will be described by using FIG. 11. FIG. 11 is a flowchart showing the path cost set value changing process according to Modified Example 1. This replaces the operation flow of the embodiment shown in FIG. 7. It is to be noted that control is not performed during BPDU sending in Modified Example 1 as described above, and thus the operation flow of the embodiment shown in FIG. 8 is not carried out.

First, when a logical band is set in the STI of the bridge by a network operator, the path cost calculation unit 112 of the bridge determines whether the set band is setting of a policing rate/a shaping rate or not (S111). If the setting is a policing rate or a shaping rate (S111; YES), the path cost calculation unit 112 calculates a path cost value corresponding to the policing rate or the shaping rate (S114). On the other hand, if the setting is not a policing rate or a shaping rate (S111; NO), the path cost calculation unit 112 determines whether the setting makes a logical band unset and a shaping rate is set or not in the other STI (S112). If the setting makes a logical band unset and a shaping rate is set in the other STI (S112; YES), the path cost calculation unit 112 calculates a value obtained by subtracting a policing rate or a shaping rate set in the other logical port from a physical band of the port as a virtual rate (S113). Then, the path cost calculation unit 112 calculates a path cost value corresponding to the virtual rate (S114). If the setting is another setting or the like (S82; NO), a path cost value corresponding to the physical band set as a default is calculated (S85). Then, each of the path cost values calculated by the path cost calculation unit 112 is set to be a path cost set value 114 of the target port by the path cost setting unit 113 (S116).

<<Operation Effect of Modified Example 1>>

At the bridge of Modified Example 1, when the logical link is subjected to band control by the shaper, for the STI mapped in the logical link, a shaping rate of the shaper is set as a logical band of the logical link, and a path cost value is obtained according to the logical band.

Thus, though only limited to a case in which equal shaping rates are set in both ends of the link between the bridges, a proper path cost value is calculated based on a proper logical band. Moreover, it is possible to form a proper spanning tree.

<<Modified Example 2 of Path Cost Calculation Process>>

As in the case of Modified Example 1, a modified example (referred to as Modified Example 2, hereinafter) of the path cost calculation process performed by the path cost calculation unit of the relay device of the embodiment will be described below. The path cost calculation process of Modified Example 2 is a calculation process when a logical band is built by a shaper.

In the path cost calculation process of Modified Example 2, different from the configurations of the embodiment and Modified Example 1, a path cost of an opposite port is not calculated, but a shaping rate is notified to the opposite port. For this notification, for example, an independent control packet or the like is used.

In Modified Example 2, when a shaping rate of a logical port is set, the set shaping rate is immediately notified to its opposite port by using an independent control packet. The bridge that has received the control packet changes a path cost set value of the target logical port according to a path cost value corresponding to the notified shaping rate.

Figure 12:
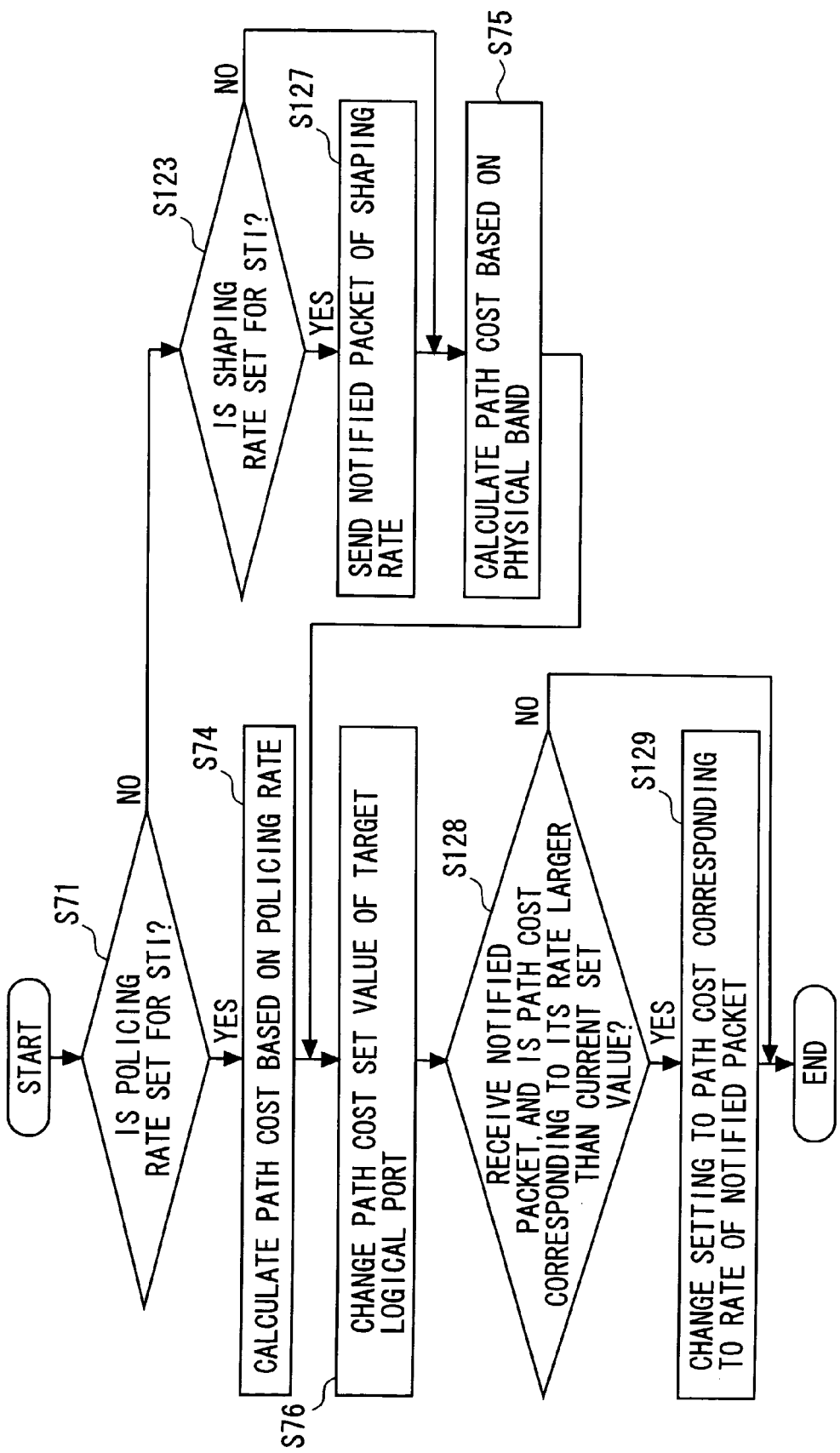
FIG. 12 is a flowchart showing a process of changing a path cost set value according to Modified Example 2.

The process of changing path cost set values for the path cost calculation unit 112 and the path cost setting unit 113 in this case is shown in FIG. 12. This replaces the operation flow of the embodiment shown in FIG. 7. Only a process different from the operation flow of the embodiment will be described below. According to Modified Example 2, control is not performed during BPDU sending as described above, and the operation flow of the embodiment shown in FIG. 8 is not carried out.

When a logical band is set in the STI of the bridge by a network operator, if the setting is setting of a shaping rate (S123; YES), the shaping rate is sent to the opposite bridge (S127). Subsequently, similarly to a case in which the setting is not setting of a shaping rate (S123; NO), a path cost set value is calculated based on a physical band (S75), and a path cost set value of a target logical port is changed (S76).

Subsequently, when a packet is notified from the opposite bridge of the bridge, a path cost corresponding to a shaping rate set in the notified packet is calculated. Then, determination is made as to whether the calculated path cost is larger or not than a current path cost set value (S128). If the path cost is determined to be larger (S128; YES), the setting is changed to the calculated path cost, i.e., a path cost corresponding to the shaping rate set in the notified packet (S129).

<<Operation Effect of Modified Example 2>>

At the bridge of Modified Example 2, when the logical link is subjected to band control by a shaper, for the STI mapped in the logical link, the shaping rate notified from the other opposite device of the logical link is set as a logical band of the logical link, and a path cost value is obtained according to the logical band.

Thus, each bridge can know the shaping rate of the opposite port. Accordingly, shaping rates do not need to be equal in both ends of the link, and an accurate path cost can be set in shaping of each direction.

<<Modified Example 1 of Path Cost Calculation Method>>

Next, a modified example (referred to as Modified Example 3, hereinafter) of a calculation method of a path cost value compliant with a logical band in the path cost calculation unit 112 will be described.

According to the embodiment, the path cost calculation unit 112 calculates the path cost by the calculation formula (path cost value=20,000,000/logical link band [Mb/s] based on the recommended path cost value defined according to the STP standard specifications (IEEE 802. 1D/w/s).

Modified Example 3 is a path cost calculation method for preparing a table correlating logical bands with path cost values beforehand, and collating an input logical band with the correspondence table to obtain a path cost. For example, a correspondence table between bands and path costs shown in FIG. 13 is prepared beforehand.

<<Operation Effect of Modified Example 3>>

At the bridge of Modified Example 3, a path cost value compliant with a band is calculated by using the table correlating the bands with the path cost values.

Thus, the network operator can calculate a path cost with high freedom by changing the setting of the table.

<<Modified Example 2 of Path Cost Calculation Method>>

Next, a modified example (referred to as Modified Example 4, hereinafter) of a calculation method of a path cost value compliant with a logical band in the path cost calculation unit 112 will be described.

According to the embodiment and Modified Example 3, the path cost calculation unit 112 employs the path cost calculation method based on the logical band of the target logical link.

According to Modified Example 4, when a minimum guaranteed band is set for the logical link, a path cost is calculated by using this minimum guaranteed band. For example, the minimum guaranteed band is a parameter defined by a shaper. It is used across the guaranteed band when a line is free. When the line is congested, a set band is guaranteed.

Thus, even when a logical link is not explicitly set, by setting a path cost based on the minimum guaranteed band in which transmission is guaranteed, a spanning tree is formed for selecting a route having a possibility of transmitting much more data.

<Reduction in Number of Path Cost Setting Steps>

Here, a result of comparison in the number of work steps of the operator who manages the network between the case of construction by the relay device of the present invention and the case of construction by the conventional relay device in the network model shown in FIG. 1 will be described below.

FIG. 14 shows operation items of the operator in the case of construction by the relay device of the present invention. Referring to FIG. 14, when the network is constructed by the relay device of the present invention, only setting of a shaper and a policer for each bridge is necessary.

On the other hand, FIGS. 15 to 17 show operations of the operator for performing setting similar to that of the case shown in FIG. 14 when the network is constructed by the conventional relay device. As can be understood from FIGS. 15 to 17, when the network is constructed by the conventional relay device, work for checking setting of the other device connected to the operated device is added to the work shown in FIG. 14. This is because when a logical band is set by a shaper, it is not the own device but the opposite device that is influenced by the function. Moreover, after the checking of each setting, work for manually calculating a path cost and inputting it for each VLAN is generated.

It can therefore be understood that when necessary setting is performed for a certain device, information set in the opposite device is necessary, complicating the work in the conventional relay device. Apparently, the danger of erroneous setting increases in the network constructed by the conventional relay device.

In other words, when the network is constructed by the relay device of the present invention, the work is simplified, and the number of operator's work steps is greatly reduced.

What is claimed is:

1. A relay device connected to a plurality of other relay devices through a plurality of physically different routes to constitute a network, comprising: a plurality of physical ports physically connected to the plurality of other relay devices on the network to form a plurality of physical links; a setting unit setting one or more logical links in a physical link of the plurality of physical links, each of the one or more logical links having a communication band equal to/lower than that of the physical link, by controlling the communication band in a way that limits a transmission rate of packets transmitted to any one of the other relay devices through the one or more logical links; an evaluation unit adding, when a control packet is transferred to any one of the other relay devices through a logical link of the one or more logical links, a value obtained by subtracting an evaluated value of the physical link in which the logical link is set from an evaluated value corresponding to the transmission rate of the logical link to an evaluated value in the transferred control packet; and a selecting unit selecting, when there are a plurality of routes from a start-point device among the other relay devices which becomes a transmission start point of the control packet to the relay device, one of the routes based on evaluated values accumulated by the relay devices included in the routes from the start-point device to the relay device.

2. The relay device according to claim 1, wherein when a control unit is provided for controlling a communication band by limiting a reception rate of packets transmitted from any one of the other relay devices connected to the logical link, the evaluation unit uses the reception rate at a logical link which receives the control packet as the evaluated value of a logical link for the control packet received through a logical link controlled by the control unit.

3. The relay device according to claim 1, wherein when a control unit is provided for building the logical link based on a minimum guaranteed band, the evaluation unit uses the minimum guaranteed band at a logical link which receives the control packet as the evaluated value of a logical link for the control packet received through a logical link controlled by the control unit.

4. The relay device according to claim 1, wherein when the control packet is received by a logical link in which a communication band is not set, the evaluation unit uses a value obtained by subtracting a communication band set at an other logical link set in the same physical link from a physical band of the physical link as the evaluated value of the logical link.

5. The relay device according to claim 1, wherein when a dividing unit is provided for dividing a one of the one or more logical links into one or more second logical links each having a communication band equal to/lower than that of the one logical link, the evaluation unit uses a communication band of the one logical link to which the second logical link receiving the control packet belongs as the evaluated value of the one logical link for the control packet received through the second logical link.

6. The relay device according to claim 1, wherein the evaluated value of the logical link is calculated by using a predetermined calculation formula in which a communication band of the logical band is an input.

7. The relay device according to claim 1, wherein the evaluated value of the logical link is calculated by using a table in which communication bands and evaluated values correspond to each other.

8. A relay device connected to a plurality of other relay devices through a plurality of physically different routes to constitute a network, comprising: a plurality of physical ports physically connected to the plurality of other relay devices on the network to form physical links; a setting unit setting a transmission logical link in a physical link of the plurality of physical links, the transmission logical link having a communication band equal to/lower than that of the physical link by controlling the communication band in a way that limits a transmission rate of packets transmitted to any one of the other relay devices through the transmission logical link; an evaluation unit adding, when a control packet is received from the any one of the other relay devices through a reception logical link, an evaluated value corresponding to the transmission rate of the transmission logical link being set in a direction opposite to the reception logical link to an evaluated value in the received control packet; and a selecting unit selecting, when there are a plurality of routes from a start-point device among the other relay devices which becomes a transmission start point of the control packet to the relay device, one of the routes based on evaluated values accumulated by the relay devices included in the routes from the start-point device to the relay device.

* * * * *